(12) United States Patent
Fujimori

(10) Patent No.: US 6,807,471 B2
(45) Date of Patent: Oct. 19, 2004

(54) STEERING WHEEL POSITION COMPENSATING APPARATUS IN STEERING APPARATUS

(75) Inventor: Hiroyuki Fujimori, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/211,839

(22) Filed: Aug. 2, 2002

(65) Prior Publication Data

US 2003/0028306 A1 Feb. 6, 2003

(30) Foreign Application Priority Data

| Aug. 2, 2001 | (JP) | ........................................ | 2001-234957 |
| Aug. 2, 2001 | (JP) | ........................................ | 2001-235121 |
| Aug. 2, 2001 | (JP) | ........................................ | 2001-235122 |
| Aug. 2, 2001 | (JP) | ........................................ | 2001-235123 |

(51) Int. Cl.$^7$ .............................................. B62D 5/04
(52) U.S. Cl. ........................................ 701/41; 180/443
(58) Field of Search ..................... 701/41, 42; 180/443, 180/446

(56) References Cited

U.S. PATENT DOCUMENTS 5,554,969 A    9/1996 Eguchi ........................ 340/438

FOREIGN PATENT DOCUMENTS

| EP | 0 596 167 A1 | 5/1994 | |
| EP | 0 872 405 A2 | 10/1998 | |
| EP | 0 983 928 A1 | 3/2000 | ............ B62D/6/00 |
| EP | 1 052 161 A2 | 11/2000 | |
| JP | 3-30544 | 4/1991 | ............ B62D/5/09 |
| JP | 4-24270 | 4/1992 | ............ B62D/5/06 |
| JP | 7-206399 | 8/1995 | ............ B66F/9/24 |
| JP | 11-139797 | 5/1999 | |

*Primary Examiner*—Michael J. Zanelli
(74) *Attorney, Agent, or Firm*—Morgan & Finnegan, LLP

(57) ABSTRACT

A steering apparatus of a vehicle having a steered tire wheel steered in correspondence to an operation of a steering wheel is disclosed. A first sensor detects an actual position indicating a present rotational position of the steering wheel. A second sensor detects a wheel angle of the steered tire wheel. The steered tire wheel is driven by an electric type drive apparatus. The drive apparatus outputs a power output for operating the steered tire wheel in correspondence to a steering wheel operation. When a deviation exists between the actual position of the steering wheel detected by the first sensor and the wheel angle of the steered tire wheel detected by the second sensor, a first compensation for compensating the actual position of the steering wheel so as to make the deviation small is executed by controlling the power output of the drive apparatus.

49 Claims, 16 Drawing Sheets

Fig. 8(a)     Fig. 8(b)
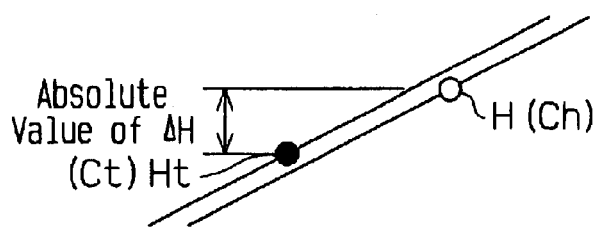
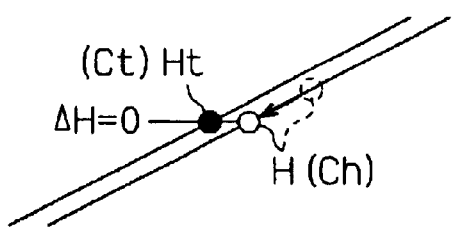
Fig. 9
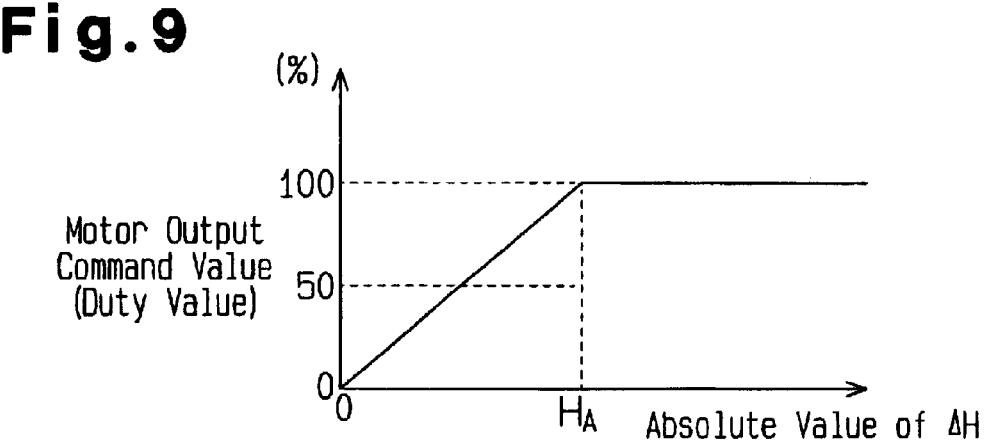
Fig. 10(a)     Fig. 10(b)
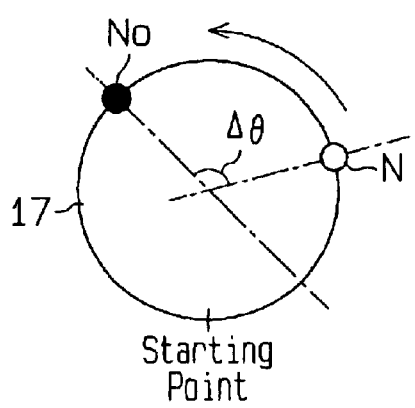
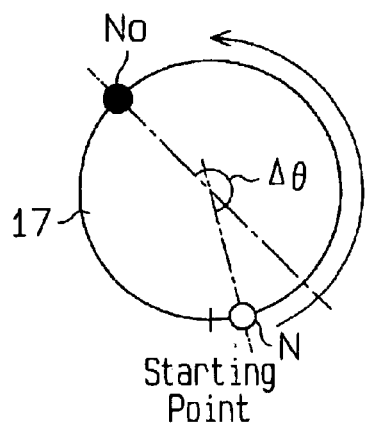

Fig.11
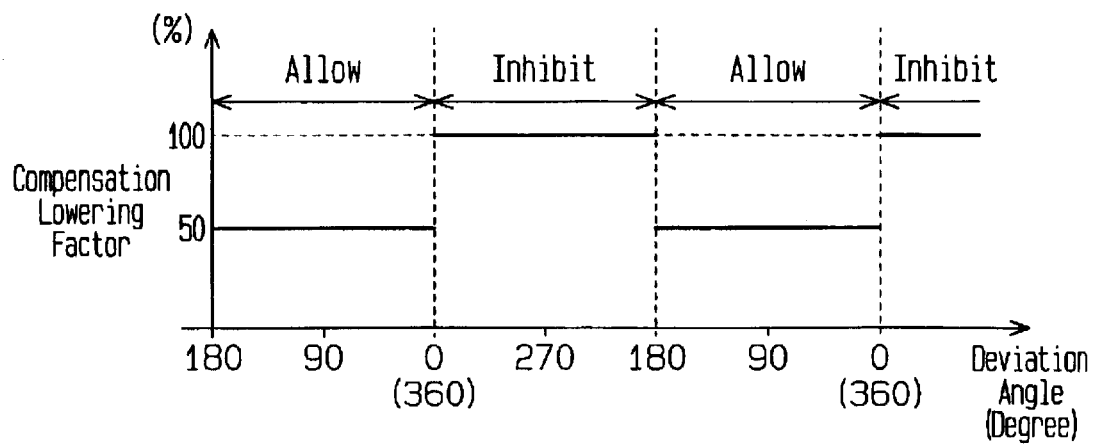
Fig.12
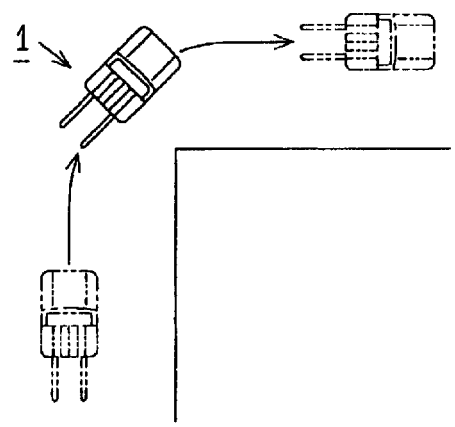
Fig.13 (a)   Fig.13 (b)   Fig.13 (c)   Fig.13 (d)   Fig.13 (e)
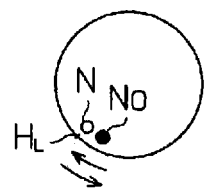    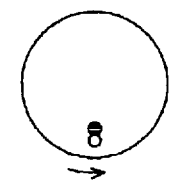    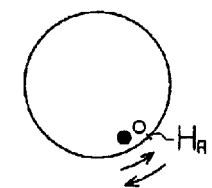
Turning Back   Compensation   Coincidence   No Compensation   Turning Back
Final Output Command Value $D_{mt}$
0    $0.5D_m$    0    $D_m$    0

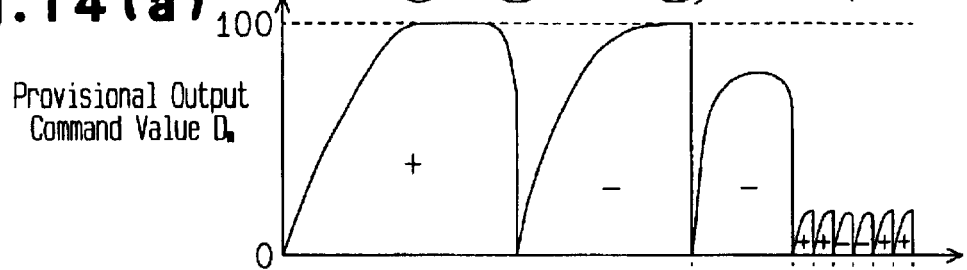
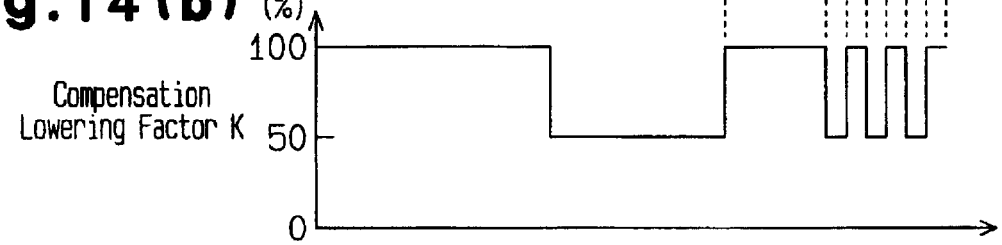
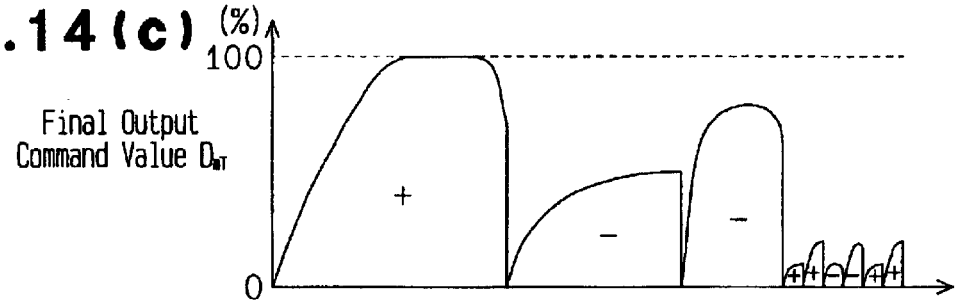
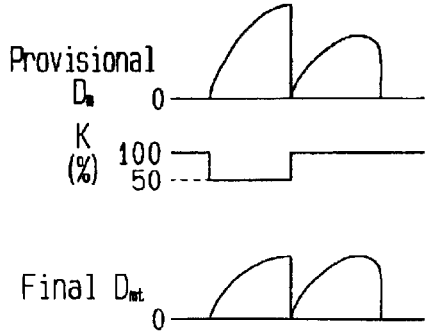
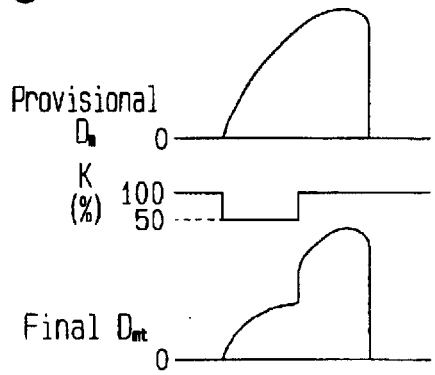

STEERING WHEEL POSITION COMPENSATING APPARATUS IN STEERING APPARATUS

BACKGROUND OF THE INVENTION

The present invention relates to a total electric type or a total hydraulic type steering apparatus in which a steering wheel of a vehicle and a steered tire wheel are not mechanically connected. More particularly, the present invention relates to a steering wheel position compensating apparatus which compensates a deviation in a positional relation between a steering wheel position (a steering wheel angle) and a wheel angle of the steered tire wheel.

Conventionally, there is a structure in which a total hydraulic type steering apparatus is equipped, in an industrial vehicle, for example, a forklift or the like. In this apparatus, a working oil at an amount corresponding to an operation amount of a steering wheel is supplied to a steering cylinder, and the steering cylinder is driven, whereby the steered tire wheel is steered in correspondence to the operation amount of the steering wheel. In this kind of industrial vehicle, there is a structure in which a knob is provided in the steering wheel so that the steering wheel can be operated by one hand while performing a loading operation by the other hand. There is a case where a driver sets a position of the steering wheel knob to a target for judging where the wheel angle of the steered tire wheel is. However, in the total hydraulic type steering apparatus, there is a problem that a deviation is caused in the positional relation between the position of the steering wheel knob and the wheel angle of the steered tire wheel, for the reason of a little deviation between the steering wheel operation amount and the supplied oil amount, an oil leakage or the like.

In order to solve the problem, a steering wheel angle compensating apparatus which compensates a deviation between the steering wheel angle and the wheel angle is disclosed, for example, in Japanese Examined Patent Publication No. Hei 3-30544 and Japanese Examined Patent Publication No. Hei 4-24270. That is, as shown in FIG. 21, a power steering apparatus 51 is provided with a controller 52, and the controller 52 inputs a steering wheel rotational signal θabs from a steering wheel angle sensor 53, and inputs a cylinder stroke signal "s" from a cylinder position sensor 54.

The controller 52 determines a target cylinder stroke from the steering wheel rotational signal θabs. Further, when a deviation between the cylinder stroke determined from the cylinder stroke signal "s" and a target cylinder stroke exceeds an allowable value, it opens an electromagnetic control valve 55. Accordingly, a part of working oil flows back to a tank 58 from one supply line of hydraulic lines 56 and 57 via another return line, a steering wheel 59 goes in a racing state, and a steering wheel position (a knob position) is compensated to a normal position in correspondence to the wheel angle of the steered tire wheel.

Further, as a steering apparatus in which the steering wheel and the steered tire wheel are not mechanically connected, a total electric type steering apparatus shown in FIG. 22, is disclosed in Japanese Unexamined Patent Publication No. Hei 7-206399. An order picking truck 61 is provided with a controller 62, and the controller 62 inputs a rotational angle of a steering wheel 63 from a potentiometer 64 and inputs a steering wheel (a wheel angle) of a steered tire wheel 65 from a potentiometer 66. Further, the controller 62 computes a deviation in a detection electric voltage between the potentiometers 64 and 66, and outputs a drive electric voltage corresponding to the deviation to a steering motor 67. Accordingly, the steered tire wheel 65 is steered so as to become a wheel angle corresponding to the operation angle of the steering wheel 63.

In this case, in the total hydraulic type steering apparatus, the steering wheel 59 and the steering cylinder 60 are connected via a hydraulic circuit. Accordingly, even when the working oil is flowed back via the electromagnetic control valve 55 during a period of executing the compensation of the steering wheel angle, a certain degree of holding force is secured in the steered tire wheel due to an existence of the working oil in the steering cylinder 60. That is, even when an external force is applied to the steered tire wheel, the steered tire wheel is not displaced until a force sufficient for pushing out the working oil within the steering cylinder 60 so as to drive the steering cylinder 60 is applied.

On the other hand, the total electric type steering apparatus is of a so-called steer-by-wire type in which the steering wheel 63 and the steered tire wheel 65 are not connected neither in a mechanical manner nor in a hydraulic circuit manner. Accordingly, since there is established a state in which a power is not transmitted to the steered tire wheel 65 in the case where the steering wheel 63 is stopped and the steering motor 67 is in a stop state, the holding force of the steered tire wheel by an operating mechanism including the steering wheel becomes comparatively weak. In particular, in the case of applying the steering wheel position compensating apparatus to the total electric type steering apparatus mentioned above, the holding force of the steered tire wheel 65 is lowered in the case of stopping driving the steering motor 67 for causing the racing of the steering wheel 68. For example, when the steered tire wheel steps on an obstacle (a stone or the like) on a traveling road surface, there has been a risk that the wheel angle of the steered tire wheel 65 deviates with respect to the steering wheel due to the external force.

In the case of employing the steering wheel position compensation, if the deviation exists between the steering wheel and the steered tire wheel, an output of the steering motor 67 is stopped during a period that the deviation exists, and the steering motor 67 is driven after the deviation does not exist. For example, during the straight traveling, there is executed an operation of fine operating the steering wheel 63 rightward or leftward so as to control a straight moving property. At this time, a direction of operating the steering wheel is switched little by little.

In this case, when the steering wheel is operated in a direction in which the deviation becomes small, the motor is stopped, and when the steering wheel is operated in a direction in which the deviation becomes large, the motor is driven. Accordingly, during a process of operating the steering wheel from a left turning point to a right turning point within the fine operation range, for example, within a narrow range of between 2° and 10° in one direction, the compensation is executed for canceling the deviation and the motor is stopped in a first half of the narrow range, and the compensation is inhibited for preventing the deviation from being made wide and the motor is driven in a second half of the narrow range. Accordingly, when the driver operates the steering wheel in one direction for the fine operation, a phenomenon that the motor output suddenly arises is easily generated in the second half.

In this case, there has been a problem that it is hard to secure a straight moving stability of the steering wheel operation, because the vehicle tends to be steered in a little serpentine manner even if the driver intends to generally fine operate the steering wheel for controlling the straight moving property. In particular, when turning a corner for right turn or left turn, the steering wheel is fine adjusted for getting right the straight moving property at a time of returning to the straight moving state from the curve traveling state, but a higher straight moving stability is required at a time of getting right an attitude of the vehicle. Accordingly, there has been required a countermeasure by which the positional relation between an actual position (the present rotational position) of the steering wheel and the wheel angle of the steered tire wheel is fitted, the output change of the steering motor 67 against the steering wheel operation before and after being switched from the compensation allowing state to the compensation inhibiting state is made as small as possible, and the straight moving stability of the steering wheel operation can be secured. This point is not limited to the total electric type steering apparatus, but is a problem in the total hydraulic type steering apparatus in the same manner.

SUMMARY OF THE INVENTION

The present invention has been achieved by taking the problems mentioned above into consideration, and a first object of the present invention is to provide a steering wheel position compensating apparatus in a total electric type steering apparatus which can secure a holding force of a steered tire wheel even during a period of executing a steering wheel position compensation, and a vehicle.

A second object is to make an output difference of driving means between before and after a positional relation between an actual position of the steering wheel and a wheel angle of the steered tire wheel fits so as to be switched from a compensating state to a compensation inhibiting state small, for example, to secure a straight moving stability of the steering wheel operation.

To achieve the foregoing and other objectives and in accordance with the purpose of the present invention, a steering apparatus of a vehicle provided with a steered tire wheel which is steered in correspondence to an operation of a steering wheel is provided. The apparatus includes first detecting means, second detecting means, electric type drive means, and compensating means. The first detecting means detects an actual position indicating a present rotational position of the steering wheel. The second detecting means detects a wheel angle of the steered tire wheel. The electric type drive means drives the steered tire wheel and outputs a power output for operating the steered tire wheel in correspondence to a steering wheel operation. The compensating means executes a first compensation for compensating an actual position of the steering wheel. The compensating means controls the power output of the drive means at a time when a deviation is detected between the actual position of the steering wheel detected by the first detecting means and a wheel angle of the steered tire wheel detected by the second detecting means, thereby reducing the deviation.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8(*a*) is a schematic view at a time when an angle difference is generated between an actual position of the steering wheel and a wheel angle of a steered tire wheel and FIG. 8(*b*) is a schematic view of a process of canceling the angle difference;

FIG. 9 is a graph showing a relation between the angle difference and the motor output command value;

FIG. 10(*a*) is a view of a state at a time when a deviation angle is within 180° and FIG. 10(*b*) is a view of a state at a time when the deviation angle is over 180°;

FIG. 11 is a graph showing a relation between the deviation angle and a compensation lowering factor;

FIG. 12 is a view of an operation at a time when a vehicle travels on a curve;

FIG. 13 is a schematic view describing a second compensation during a steering wheel fine operation;

FIG. 14 is a graph showing a change of the output command value in a curve traveling process;

FIG. 15(*a*) is a graph of the output command value for describing a principle of the second compensation and FIG. 15(*b*) is a graph of the output command value in the case where the second compensation is not executed;

DETAILED DESCRIPTION OF THE PREFERRED EMBODIMENTS

A description will be given below of a first embodiment obtained by embodying the present invention in an industrial vehicle equipped with a total electric type steering apparatus with reference to FIGS. 1 to 15(*b*).

Figure 2:
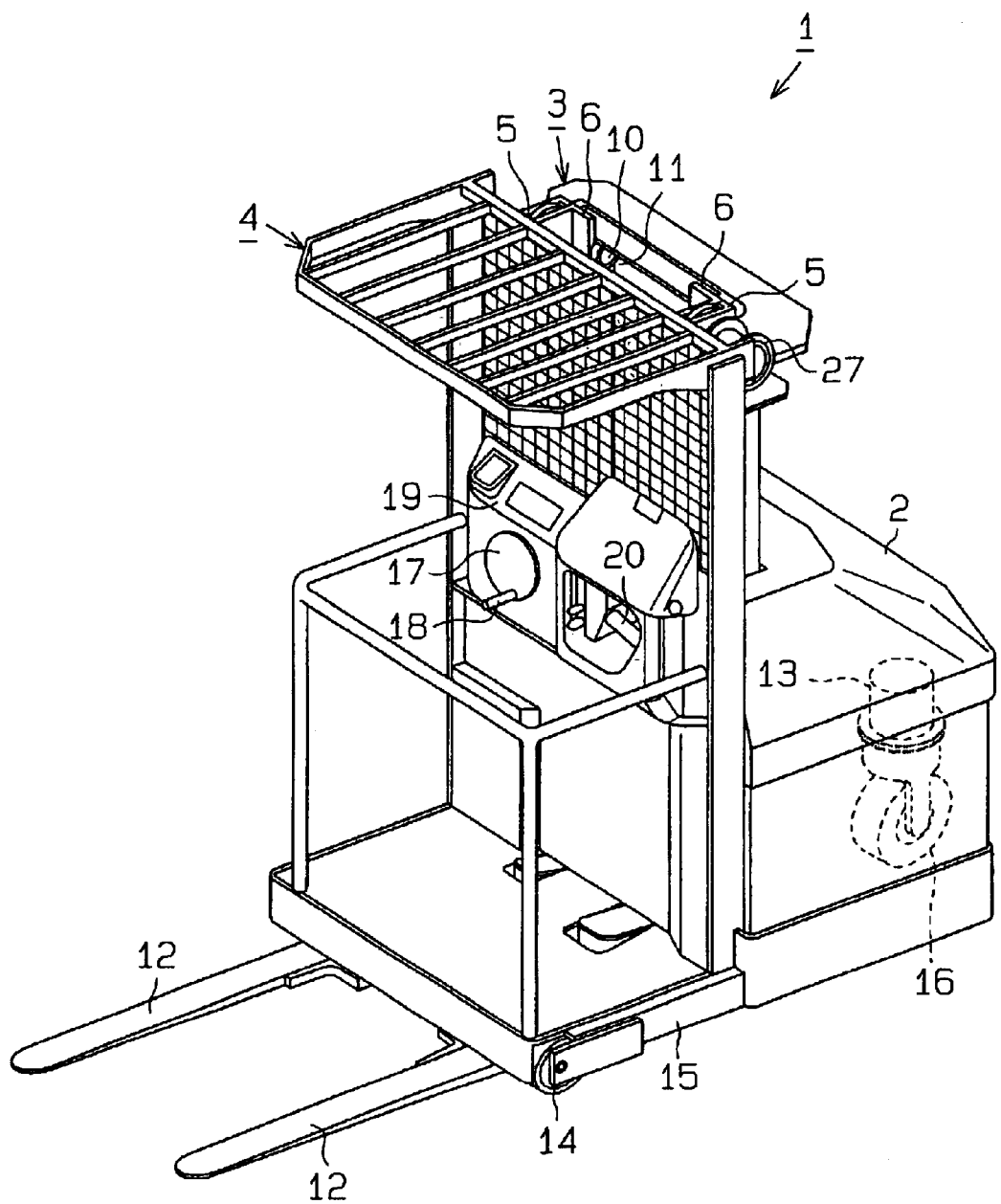
FIG. 2 is a perspective view of an order picking type forklift.

FIG. 2 is a perspective view showing an order picking type forklift (hereinafter simply referred to as a forklift). A forklift 1 is equipped with a mast apparatus 3 in a rear portion of a vehicle body 2. A driver's stand 4 is arranged in the mast apparatus 3 in such a manner as to be capable of ascending and descending along a mast 5. The mast 5 is provided with an outer mast 6 and an inner mast 7, and a distal end of a piston rod 9 (refer to FIG. 3) in a lift cylinder 8 is fixed to an upper end of the inner mast 7. Then, the lift cylinder 8 is driven, whereby the inner mast 7 slides with respect to the outer mast 6 and the mast 5 is expanded and contracted.

A sprocket 10 is mounted to an upper end portion of the inner mast 7, and the driver's stand 4 is supported in a state of being suspended to a chain 11 wound around the sprocket 10. Then, the inner mast 7 is expanded and contracted with respect to the outer mast 6 at a time of driving the lift cylinder 8, whereby the driver's stand 4 is moved upward and downward with respect to the vehicle body 2. A pair of forks 12 are mounted to a lower portion of the driver's stand 4, and the forks 12 are positioned in a vertical direction in correspondence to the upward and downward movement of the driver's stand 4.

The forklift 1 is a battery vehicle, and has a traveling motor 13 mounted on the vehicle body 2 as a drive source. Two rear tire wheels correspond to driven tire wheels 14 (only one is illustrated), and one front tire wheel corresponds to a drive steered tire wheel 16. The driven tire wheels 14 are respectively mounted to rear end portions of a pair of legs 15 extending out to rear sides from both sides of the vehicle body 2, and the drive steered tire wheel (hereinafter simply referred to as a steered tire wheel) 16 is arranged at a substantially center position in a vehicle width direction of a front portion in the vehicle body 2.

A steering wheel 17 is mounted to a forward front face of the driver's stand 4 (a right side surface in FIG. 2), and the steered tire wheel 16 is steered by operating the steering wheel 17 and a traveling direction of the forklift 1 is changed. A steering wheel knob 18 is formed in a predetermined portion of the steering wheel 17, and the structure is made such that it is possible to rotate the steering wheel 17 without restricting a maximum rotation amount in both of a clockwise direction and a counterclockwise direction. Further, in addition to the steering wheel 17, an instrument panel 19, an operating level 20 and various kinds of switches (not shown) are arranged in the driver's stand 4.

Figure 3:
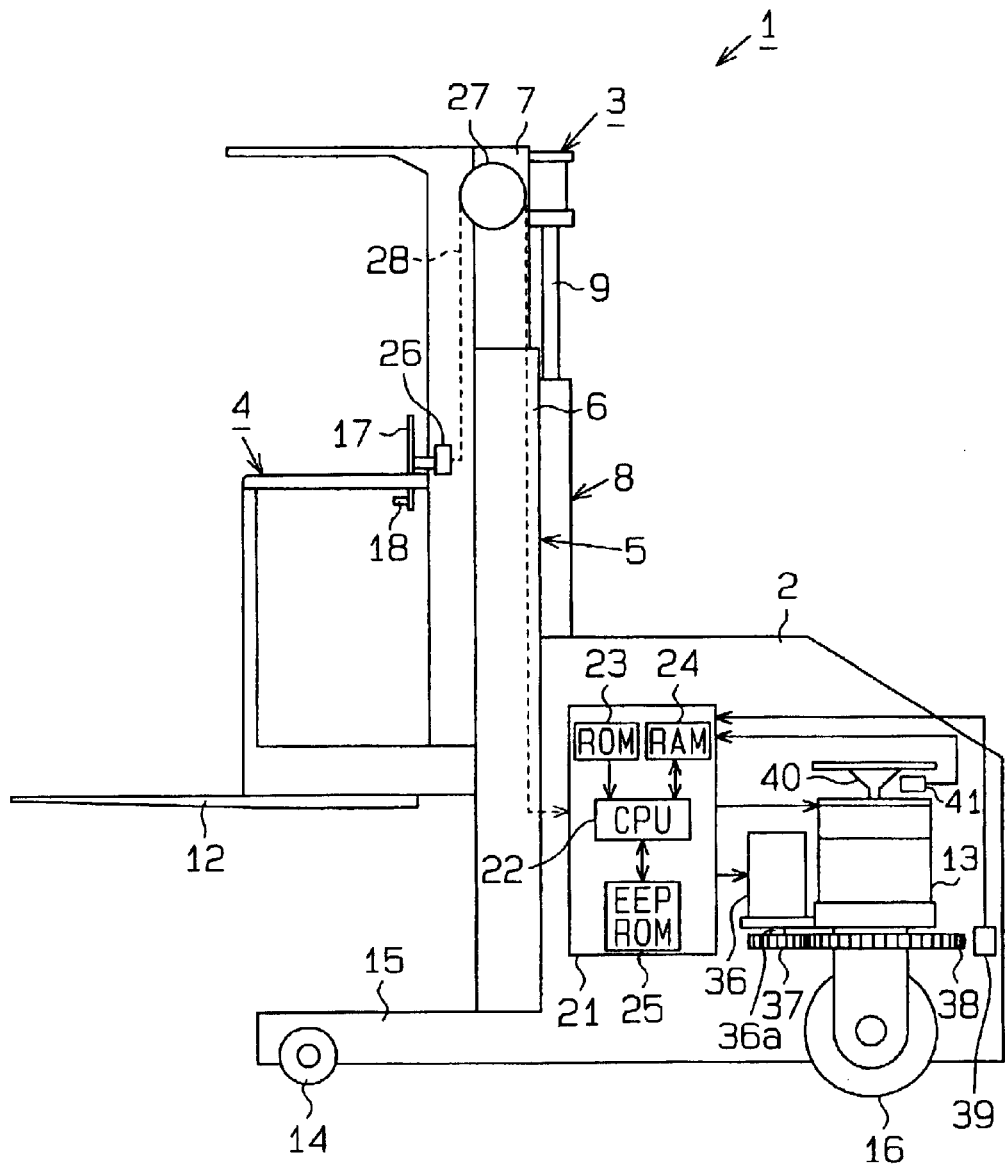
FIG. 3 is a side elevational view showing an outline structure of the forklift.

FIG. 3 shows a schematic structure of the forklift 1. The forklift 1 is provided with a controller 21, and a CPU 22, a ROM 23, a RAM 24 and an EEPROM 25 are installed in the controller 21. A program for a control of the steered tire wheel 16 and a compensation control of a steering wheel knob position is stored in the ROM 23.

An arithmetic operation result executed by the CPU 22 and the like are temporarily stored in the RAM 24, and a link ratio, a compensation lowering factor K and the like are stored in the EEPROM 25. The CPU 22 executes a steered tire wheel control and a knob position compensation control in accordance with the control program stored in the ROM 23. In this case, the CPU 22 constitutes compensating means, second compensating means, reset means and steered tire wheel holding means.

Figure 5A:
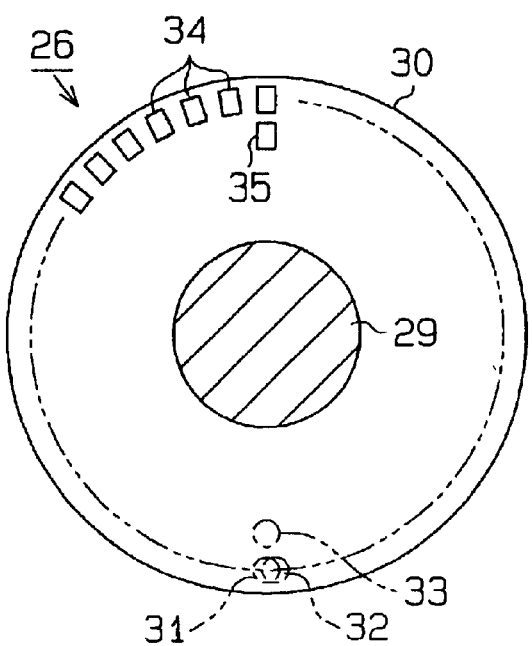
FIG. 5(*a*) is a schematic view of a steering wheel angle sensor and FIG. 5(*b*) is a view of a signal waveform output from the steering wheel angle sensor.

A steering wheel angle sensor 26 is mounted to the steering wheel 17, and the steering wheel angle sensor 26 is connected to an input side of the controller 21 via an electric wire cable 28 wound around a pulley 27. The steering wheel angle sensor 26 is constituted by a rotary encoder, and is provided with a disc 30 fastened to a main shaft 29 of the steering wheel 17, three light receiving elements 31 to 33 arranged in an outer side in a radial direction of the disc 30, and a light emitting element (not shown), as shown in FIG. 5(a).

A plurality of (forty in the present embodiment) slits 34 are formed in a circumferential edge portion of the disc 30 at a uniform interval along a circumferential direction, and one slit 35 is formed in an inner side in a radial direction of the slits 34. Two outer light receiving elements 31 and 32 are arranged in a state of being arranged at a predetermined interval in the circumferential direction at an opposing position to the outer slits 34. Further, remaining one inner light receiving element 33 is arranged at an opposing position to the inner slit 35 and a starting position of the steering wheel knob 18.

Figure 5B:
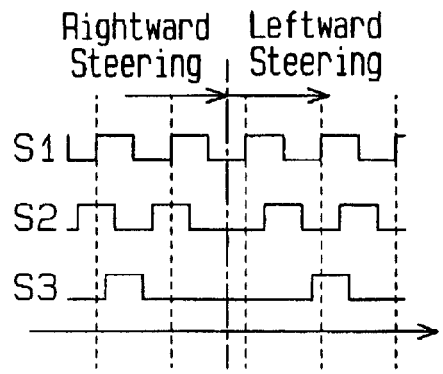

The outer light receiving elements 31 and 32 receive lights output from the light emitting element via the outer slits 34, and respectively output pulse-shaped first and second detection signals S1 and S2 having a 90° phase deviation shown in FIG. 5(b) to the CPU 22. Then, the CPU 22 counts edges of these two detection signals S1 and S2, thereby computing an operation angle of the steering wheel 17 (a steering wheel angle H and an actual knob position N). In the present embodiment, an angle detection is executed on the basis of a resolving power in which one rotation of the steering wheel 17 is separated into 160 sections, and a detected angle is changed at 2.25° every one edge count.

Further, the inner light receiving element 33 receives the lights output from the light emitting element via the inner slit 35, and outputs a third detection signal (a pulse signal) S3 shown in FIG. 5(b) to the CPU 22. Further, when an H level of the third detection signal S3 is detected, the CPU 22 judges that the steering wheel knob 18 is arranged at the starting position. Further, when a rising edge of the first detection signal S1 is detected, the CPU 22 judges a "right steering" in the case where the second detection signal S2 is in the H level, and judges a "left steering" in the case where the second detection signal S2 is in an L level. Further, the CPU 22 computes a steering wheel operating speed S of the steering wheel 17 on the basis of a time interval of the first or second detection signals S1 (S2) input from the steering wheel angle sensor 26.

As shown in FIG. 3, the forklift 1 is provided with a power steering motor (hereinafter referred to as a PS motor) 36 corresponding to drive means within the vehicle body 2, and a gear 37 attached to an output shaft 36a of the PS motor 36 is engaged with a gear wheel 38 supporting the steered tire wheel 16. Further, when the PS motor 36 is driven, a drive force is transmitted to the gear wheel 38 from the gear 37, and the steered tire wheel 16 is steered in a direction in correspondence to a rotational direction of the PS motor 36. The PS motor 36 and the traveling motor 13 are driven and controlled by the controller 21.

A wheel angle sensor 39 constituting wheel angle detecting means is mounted to a position opposing to the gear wheel 38, and the wheel angle sensor 39 is connected to an input side of the controller 21. The wheel angle sensor 39 is constituted, for example, by a potentiometer, and outputs a detection signal (an electric voltage value) in correspondence to a wheel angle R of the steered tire wheel 16 to the CPU 22. The steered tire wheel 16 can be steered to about 90° at the maximum rightward and leftward, respectively. The CPU 22 computes the wheel angle R of the steered tire wheel 16 within the angle range on the basis of the detection signal output from the wheel angle sensor 39.

A vehicle speed sensor 41 is mounted to a position opposing to the drive shaft 40 in the traveling motor 13. The vehicle speed sensor 41 outputs a detection signal (a pulse signal) in correspondence to a rotation of the drive shaft 40 by detecting a detected portion (not shown) formed on an outer peripheral surface of the drive shaft 40 of the traveling motor 13. The CPU 22 computes a vehicle speed V of the forklift 1 by measuring a time interval between a plurality of detection signals input from the vehicle speed sensor 41.

Since the steered tire wheel 16 and the steering wheel 17 are not mechanically connected, it is necessary to set a link ratio between the steering wheel 17 and the steered tire wheel 16. The link ratio means a rotation rate between the steering wheel 17 and the steered tire wheel 16, and in the present embodiment, the link ratio is set to "12". Accordingly, when the steering wheel 17 is rotated at six rotations (360°×6), the steered tire wheel 16 rotates about 180° from one end to another end.

Figure 4:
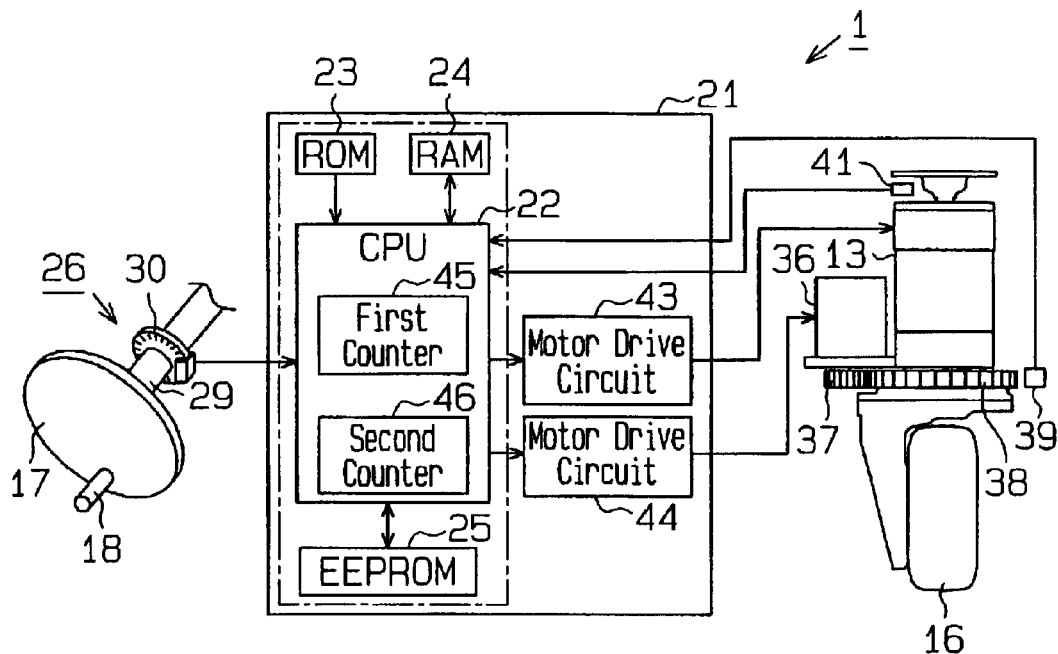
FIG. 4 is a block diagram showing an electric circuit of the forklift.

As shown in FIG. 4, the controller 21 of the forklift 1 is provided with a motor drive circuit 43 connected to the traveling motor 13, and a motor drive circuit 44 connected to the PS motor 36. The CPU 22 inputs the detection signal output from the steering wheel angle sensor 26 and the detection signal output from the wheel angle sensor 39, and outputs an output command value (a duty value) Dm computed on the basis of these signal values to the motor drive circuit 44.

The motor drive circuit 44 outputs a drive electric current in correspondence to the output command value output from the CPU 22 to the PS motor 36, and the PS motor 36 outputs a drive force (a torque) in correspondence to the electric current value. Of course, the PS motor 36 may be driven by an electric voltage control. In the manner mentioned above, in the total electric type steering apparatus, the steered tire wheel 16 is steered to the wheel angle R in correspondence to the operation of the steering wheel 17.

The CPU 22 is provided with a first counter 45 and a second counter 46. The first counter 45 and the second counter 46 count the edges of the rising edges and the falling edges in each of the pulse signals S1 and S2 which are output from the steering wheel angle sensor 26, and count a count value of totally 160 pulses every one rotation of the steering wheel. In this case, the first counter 45 is used for determining the output command value Dm which is output to the motor drive circuit 44 for driving the PS motor 36. Further, the second counter 46 is used for executing the knob position compensating control.

Figure 6:
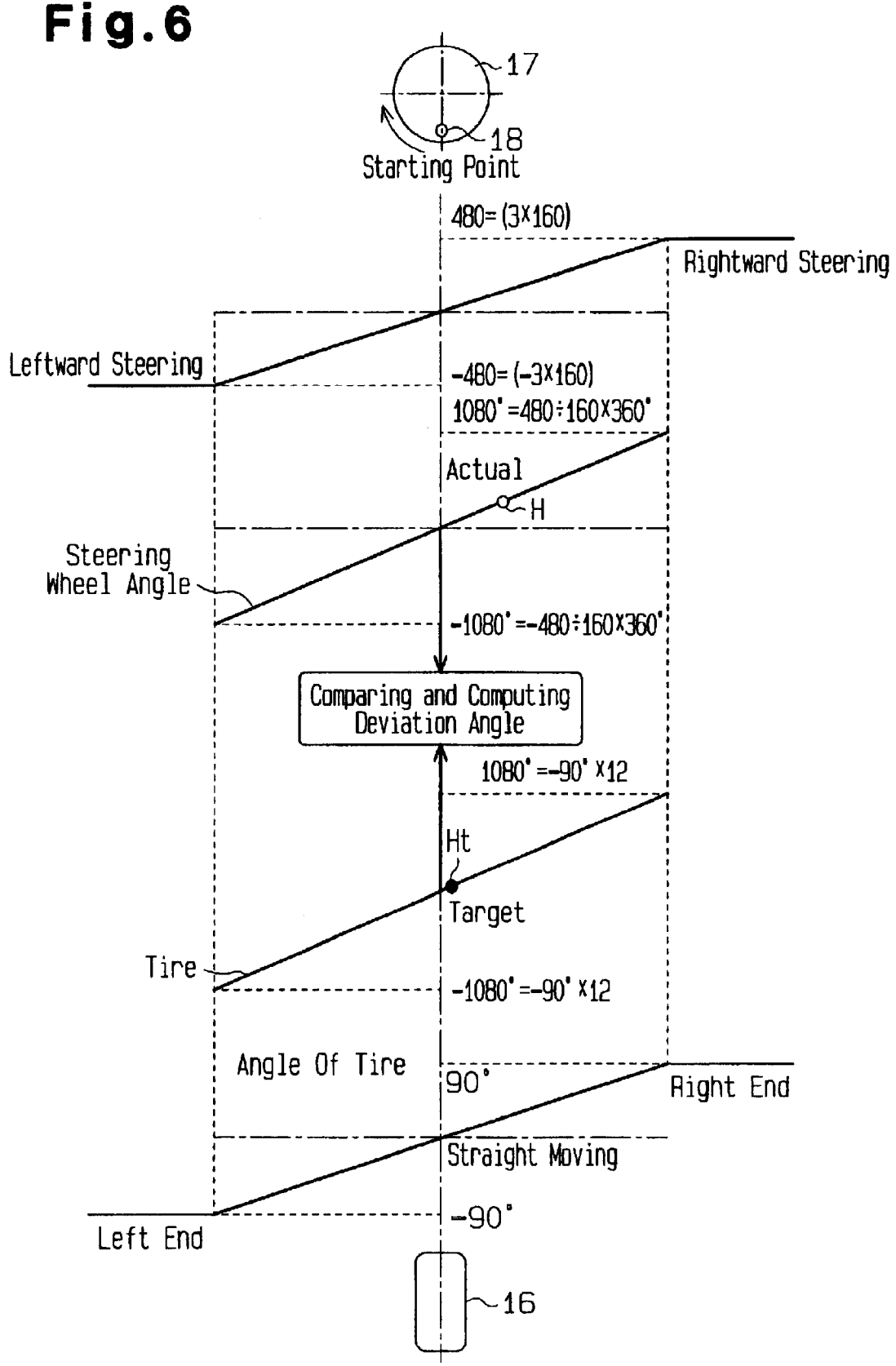
FIG. 6 is a view describing a computing method of an output command value of a PS motor.

FIG. 6 is a view describing a computing method of the output command value in the PS motor 36. In the case where the link ratio is "12", the steering wheel 17 rotates at six rotations at a time when the steered tire wheel 16 rotates from one end to another end. Further, since the pulses are counted to 0 to 159 at a time of rotating the steering wheel 17 at one rotation, the first counter 45 counts six rotations of the steering wheel 17 as a count value Ch between −480 and +480, on the assumption that a leftward steering of the steering wheel 17 is "−" and a rightward steering is "+" on the basis of a straight moving state of the steered tire wheel 16.

At this time, the CPU 22 converts the count value Ch counted by the first counter 45 into an angle, and computes a steering wheel angle H of the steering wheel 17 within a range of between −1080° (−480/160×360°) and +1080° (+480/160×360°). In this case, the first counter 45 does not execute a count-down in the case where the count value becomes a value indicating the left end of the steered tire wheel 16, that is, equal to or less than −480, and does not execute a count-up in the case where the count value becomes a value indicating the right end, that is, equal to or more than +480.

On the other hand, since the wheel angle R of the steered tire wheel 16 is set to 90° at the maximum rightward and leftward, respectively, the CPU 22 computes the wheel angle R of the steered tire wheel 16 within the range of between −90° and +90°, on the basis of the detection signal output from the wheel angle sensor 39. Further, the CPU 22 multiplies the computed wheel angle R of the steered tire wheel 16 by the link ratio "12", thereby computing a conversion value Ht which is obtained by converting the wheel angle R into the steering wheel angle within the range of between −1080° and +1080°.

After computing the steering wheel angle H and the conversion value Ht, the CPU 22 determines a difference between these values so as to compute a deviation in a positional relation between the steering wheel 17 and the steered tire wheel 16, that is, an angle difference ΔH (ΔH=H−Ht). Further, it computes the output command value (the duty value) Dm of the PS motor 36 by using a relation shown in FIG. 9 on the basis of the angle difference ΔH. As shown in the drawing, the output command value Dm is increased in proportion to the angle difference within the range that an absolute value of the angle difference ΔH is between 0 and HA with respect to the absolute value of the angle difference ΔH, and the output command value becomes 100% when the absolute value is over HA. The value HA is set to a predetermined value, for example, within a range of between 50° and 200°. In this case, the PS motor 36 is rightward rotated (rightward steering rotated) at a time when a relation ΔH>0 is established, and is leftward rotated (leftward steering rotated) at a time when a relation ΔH<0 is established.

Further, the CPU 22 executes a process for aligning a steering wheel position information with a steered tire wheel position information at a time when the steering wheel 17 is turned back or the steering of the steering wheel 17 is stopped. That is, the CPU 22 computes a counter conversion value Ct in correspondence to the wheel angle R, and sets the counter conversion value Ct to the first counter 45. Accordingly, the count value Ch of the first counter 45 and the counter conversion value Ct become the same value, the angle difference ΔH becomes "0" and the electric current value supplied to the PS motor 36 becomes "0".

That is, when the steering wheel 17 is steered in a state in which the angle difference ΔH shown in FIG. 8(a) exists, and the operation of the steering wheel 17 is stopped in this state or the steering wheel 17 is turned back, the counter conversion value Ct determined on the basis of the wheel angle R is forcibly set to the first counter 45. As a result, in view of the process using the first counter 45, there is established a state in which the angle difference ΔH does not exist (ΔH=0) as shown in FIG. 8(b). Accordingly, in spite of employing a processing method of determining the output command value Dm on the basis of the angle difference ΔH, it is possible to stop the steered tire wheel 16 by stopping the steering wheel operation, and it is possible to stop the steered tire wheel 16 in a moment by turning back the steering wheel 17. Further, since the decoded angle difference ΔH is generated after turning back the steering wheel, the steered tire wheel 16 is reverse rotated.

Further, for example, when the forklift 1 travels, there is a case in which the steered tire wheel 16 is brought into contact with an obstacle (a stone or the like) on the traveling road surface and the wheel angle R of the steered tire wheel 16 is deviated in spite that the steering wheel 17 is not operated. At this time, since the value of the angle difference ΔH sequentially computed by the CPU 22 is not "0", the CPU 22 drives the PS motor 36 so as to cancel the angle difference ΔH. Accordingly, even when the wheel angle R of the steered tire wheel 16 is deviated due to an external force, a restoring force for restoring to the original wheel angle R is generated. Since the power for steering is not transmitted to the steered tire wheel 16 during the stop of the PS motor 36, the holding force for holding the steered tire wheel 16 in the fixed wheel angle R is lowered. However, since the PS motor 36 is driven and the restoring force for restoring to the original wheel angle R is applied in the case where the wheel angle R of the steered tire wheel 16 is going to be deviated due to the external force, the holding force of the steered tire wheel 16 is secured.

Figure 7:
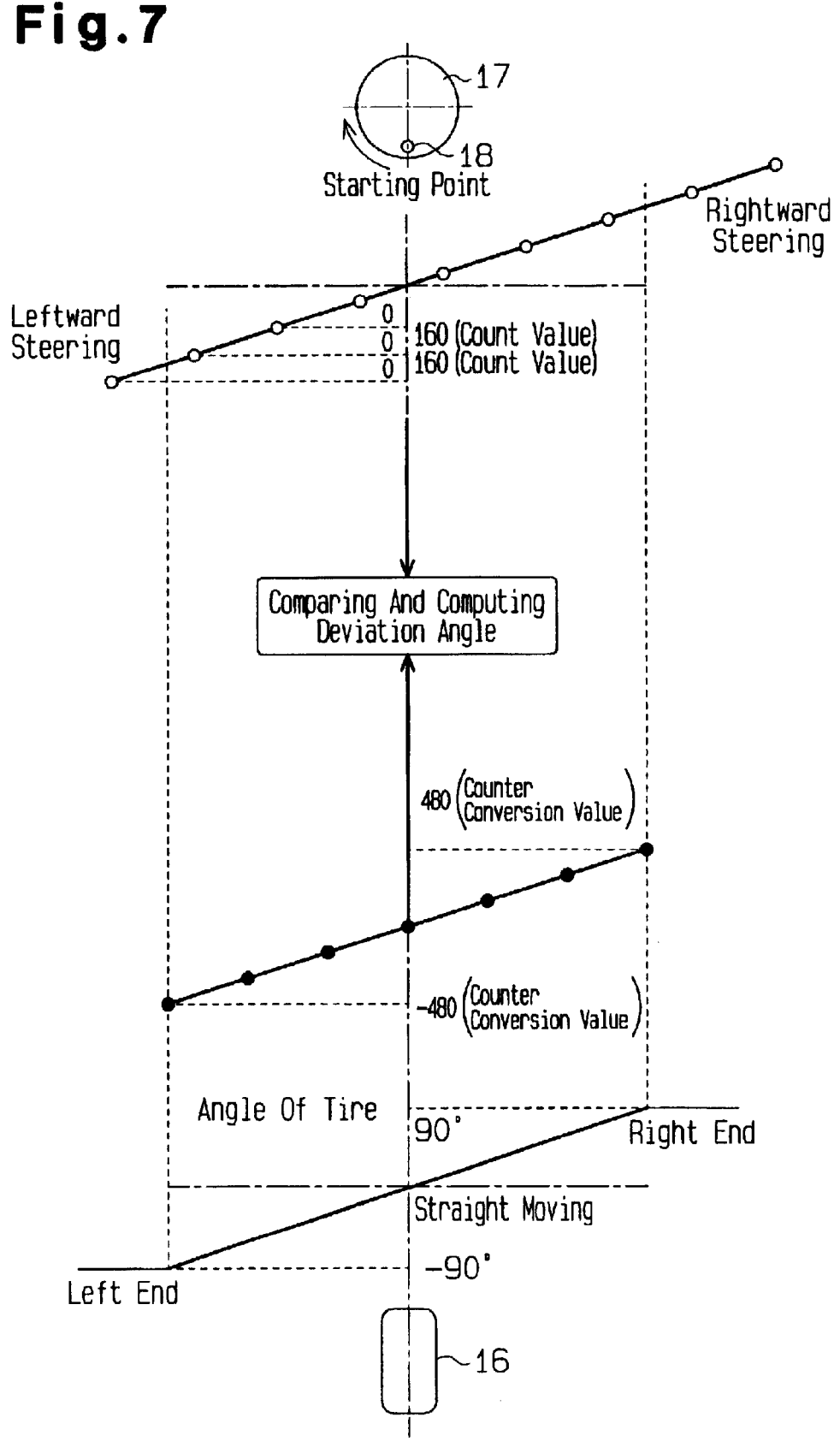
FIG. 7 is a view describing a steering wheel knob position compensation control.

FIG. 7 is a schematic view describing the compensation control of the steering wheel knob position. The second counter 46 counts totally 160 pulses between 0 and 159 with respect to the rotation of the steering wheel 17, and the count value is reset every time when the steering wheel knob 18 coincides with the starting point and detects the pulse of the detection signal S3 output from the light receiving element 33. That is, the second counter 46 sets the value of the second counter 46 to "0" at a time when the steering wheel knob 18 reaches the starting point shown in FIGS. 10(a) and 10(b), and the second counter 46 counts the count value Cn between 0 and 159 at a time when the steering wheel 17 is steered from the state in which the knob is arranged at the starting point. The CPU 22 computes an actual position N of the steering wheel knob 18 within the range of between 0 and 360° on the basis of the count value Cn of the second counter 46. The actual position N indicates what position within the range of one rotation of the steering wheel the steering wheel knob 18 is positioned on the basis of the starting point, in other words, the present rotational position of the steering wheel.

On the other hand, the CPU 22 computes the wheel angle R of the steered tire wheel 16 within the range of between −90° and +90° in the manner mentioned above, and computes the conversion value Ht by multiplying the computed wheel angle R by the link ratio "12". At this time, the CPU 22 computes the counter conversion value Ck for comparing with the count value Cn of the second counter 46, on the basis of the conversion value Ht. This counter conversion value Ck is a value between 0 and 159, and a value in correspondence to the position by which the steering wheel knob 18 should be arranged in correspondence to the wheel angle of the steered tire wheel 16. The CPU 22 computes a target position No of the steering wheel knob 18 within the range of between 0° and 360° on the basis of the counter conversion value Ck.

Further, when the CPU 22 detects the steering of the steering wheel 17, the CPU 22 detects an operating direction thereof, and computes a deviation angle Δθ from the actual position N of the knob to the target position No along the operating direction of the steering wheel 17. Further, when the deviation angle Δθ is within 180° (refer to FIG. 10(a)), the CPU 22 executes a first compensation, and computes a final output command value Dmt by multiplying a provisional output command value Dm to the PS motor 36 by a compensation lowering factor K. In this connection, in the present embodiment, a value of the compensation lowering factor K is set to "0.5", and a first compensation is executed, whereby a drive electric current value to the PS motor 36 is reduced to 50%.

Then, the CPU 22 outputs the final output command value Dmt (K·Dm) reduced to 50% to the motor drive circuit 44, and the electric current value on the basis of the output command value is output to the PS motor 36. Accordingly, the PS motor 36 rotates at a lower speed than the normal one, and the actual position N of the knob catches up with the target position No at a time of operating the steering wheel, whereby the position deviation of the steering wheel knob 18 is cancelled.

On the other hand, the CPU 22 does not execute the first compensation at a time when the deviation angle Δθ is over 180° (refer to FIG. 10(b)). The reason is as follows. That is, in the total electric type steering apparatus, since the steering wheel 17 and the PS motor 36 are not mechanically linked, there is a case where the actual position N of the steering wheel 17 is largely deviated with respect to the target position No. Accordingly, when executing the first compensation in the case where the deviation angle Δθ in the steering wheel operating direction is over 180°, there is generated a case where the deviation angle Δθ becomes larger than that before the compensation in some timing of stopping the steering wheel operation.

Further, in the case of rotating the steering wheel 17 in the same direction, since the compensation lowering factor K (K=0.5) is multiplied only at a time when the deviation equal to or less than 180° is generated between the actual position N of the knob and the target position No in the steering wheel 17, an area in which the output of the PS motor 36 is lowered and an area in which the output is not lowered alternately appear every 180° of the deviation angle Δθ. That is, as shown in FIG. 11, the deviation angle Δθ less than 180° corresponds to a compensation allowing area, and the deviation angle Δθ over 180° corresponds to a compensation inhibiting area.

Further, when the actual position N coincides with the target position No, the CPU 22 executes a second compensation by setting the electric current value supplied to the PS motor 36 "0". That is, the CPU 22 sets the angle difference ΔH to "0" by setting the counter conversion value Ct determined in correspondence to the wheel angle R of the steered tire wheel 16 to the first counter 45, and sets the electric current value output to the PS motor 36 to "0". This is because of increasing a straight moving stability of a steering wheel operation at a time of returning the moving direction back to the straight moving state at the travel end, for example, in the case of traveling the forklift 1 along the corner having substantially 90° as shown in FIG. 12. That is, at a time of returning the forklift 1 to the straight moving state from the curve traveling state, the steering wheel 17 is normally fine operated rightward and leftward around the starting point at a time of returning to the substantially straight moving state. At this time, the second compensation is executed, whereby the PS motor 36 is stopped for a moment in the instant that the actual position N coincides with the target position No.

When the first compensation is executed, the actual position N of the knob moves from the compensation allowing area to the compensation inhibiting area before or after the knob actual position N coincides with the target position No at a time of fine operating the steering wheel 17 rightward and leftward, and the output of the PS motor 36 is switched from a reduced state (K=0.5) to the normal state (K=1). However, since the second compensation is executed and the output of the PS motor 36 becomes "0" for a moment in the instance that the actual position N coincides with the target position No, it is possible to prevent the output (Dm) of the PS motor 36 after the compensation lowering factor is switched from K=0.5 to K=1 from being extremely increased (for example, twice increased) in comparison with the output (0.5 Dm) before switching.

As mentioned above, since the output difference of the PS motor 36 is reduced between before and after being switched to the compensation inhibiting area from the compensation allowing area due to the execution of the second compensation, it is possible to avoid the matter that the steered tire wheel 16 is slightly excessively steered so as to establish the straight traveling close to a serpentine manner at a time of fine operating the steering wheel 17 rightward and leftward. Accordingly, it is possible to secure the straight moving stability of the steered tire wheel 16 with respect to the steering wheel operation. This is useful not only at a time of returning to the straight moving in the curve traveling but also for securing the straight moving stability during the straight traveling.

Figure 1:
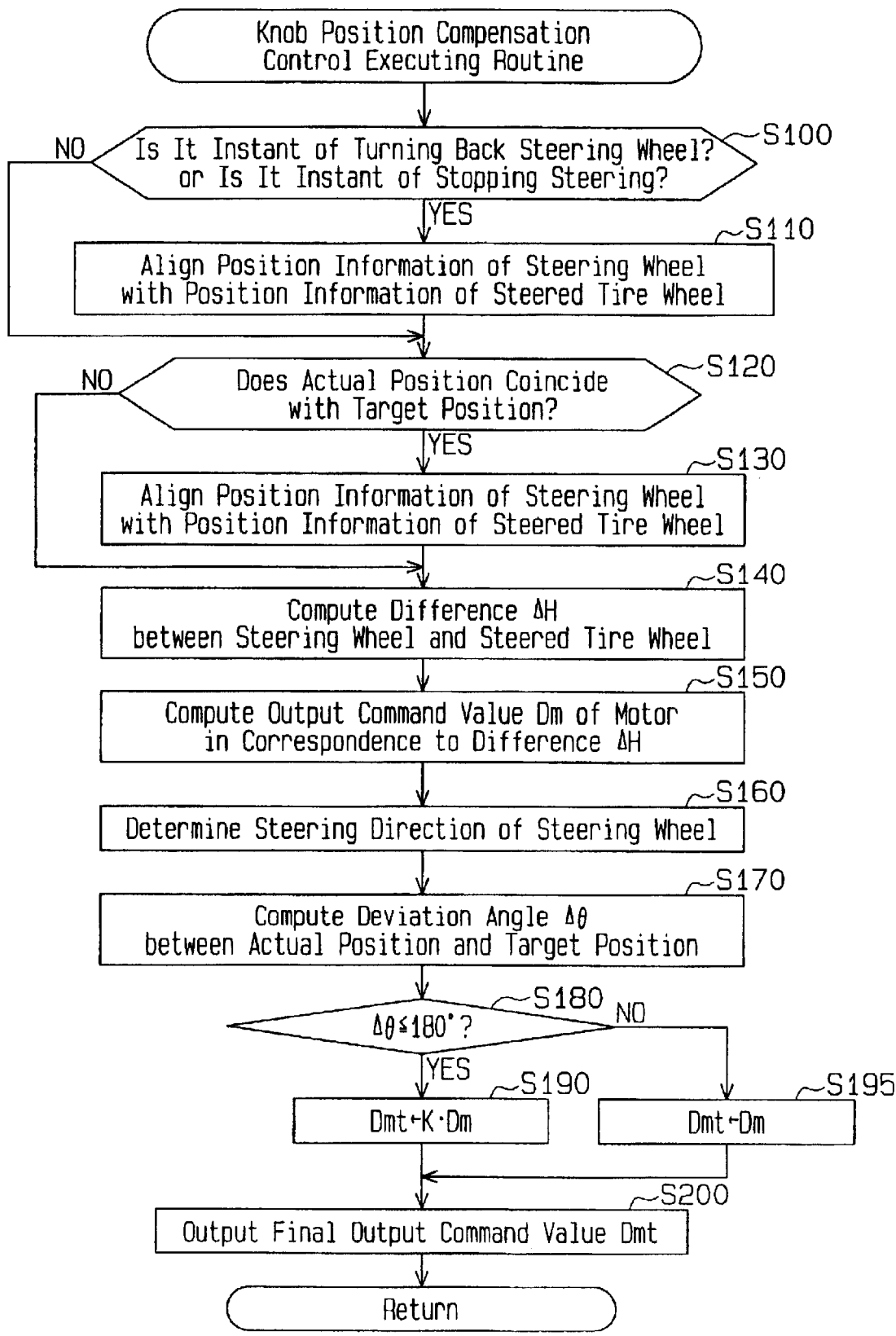
FIG. 1 is a flow chart showing an executing procedure of compensating a steering wheel knob position in accordance with a first embodiment of the present invention.

FIG. 1 is a flow chart showing a procedure which the CPU 22 executes at a time of executing the compensation of the steering wheel knob position. S160 to S190 correspond to the first compensation, and S120 and S130 correspond to the second compensation. This flow chart is executed repeatedly at a predetermined time interval, for example, within a range of between 2 and 50 milliseconds.

At first, in a step (hereinafter simply described by S) 100, it is judged whether or not it is an instant of turning back the steering wheel 17 or whether or not it is an instant of stopping the steering of the steering wheel 17. When the steering wheel 17 is turned back, or the steering is stopped, the step proceeds to S110, and otherwise the step proceeds to S120.

In S110, the position information of the steering wheel 17 is aligned with the position information of the steered tire wheel 16. That is, the CPU 22 sets the counter conversion value Ct determined on the basis of the wheel angle R of the steered tire wheel 16 to the first counter 45. Accordingly, the angle difference ΔH becomes "0", the output of the PS motor 36 becomes "0", and the steering of the steered tire wheel 16 is stopped. Therefore, there is not generated a problem that the steering of the steered tire wheel 16 is continued in spite that the steering wheel 17 is stopped, and the steering direction of the steered tire wheel 16 is not reversed in spite that the steering wheel 17 is turned back.

In S120, it is judged whether or not the actual position N of the steering wheel knob 18 coincides with the target position No determined on the basis of the wheel angle R of the steered tire wheel 16. That is, it is judged whether or not the count value Cn of the second counter 46 coincides with the counter conversion value Ck determined on the basis of the wheel angle R of the steered tire wheel 16. When the actual position N coincides with the target position No, the step proceeds to S130, and otherwise the step proceeds to S140.

In S130, the position information of the steering wheel 17 is aligned with the position information of the steered tire wheel 16. That is, the CPU 22 sets the counter conversion value Ct determined on the basis of the wheel angle R of the steered tire wheel 16 to the first counter 45. Every time when the actual position N of the knob coincides with the target position No during the operation of the steering wheel, the angle difference ΔH becomes "0" and the output command value Dm becomes "0". As a result of the second compensation, the output of the PS motor 36 is stopped for a moment.

Accordingly, in the case of fine operating the steering wheel 17 rightward and leftward for controlling the vehicle straight moving property at a time of traveling, the PS motor 36 is not excessively driven and it is possible to prevent the vehicle from traveling slightly rightward and leftward in a serpentine manner. In particular, at a time of returning the forklift 1 from the curve traveling state to the straight traveling state, the straight moving stability with respect to the steering wheel operation can be secured. Of course, it is possible to secure the straight moving stability at a time of traveling straight.

In S140, the angel difference ΔH between the steering wheel 17 and the steered tire wheel 16 is computed. That is, the CPU 22 computes the steering wheel angle H of the steering wheel 17 on the basis of the count value Ch of the first counter 45, and computes the steering wheel conversion value Ht from the wheel angle R determined on the basis of the detection signal output from the wheel angle sensor 39. Further, the CPU 22 determines the difference between two values H and Ht so as to compute the angle difference ΔH between the steering wheel 17 and the steered tire wheel 16.

In S150, the output command value Dm of the PS motor 36 in correspondence to the angle difference ΔH is computed. That is, the CPU 22 computes the output command value Dm by multiplying the angle difference ΔH by a predetermined factor determined on the basis of the relation shown in FIG. 9.

In S160, the steering direction of the steering wheel 17 is determined. That is, the CPU 22 compares and processes two pulse signals having the deviated phases input from the steering wheel angle sensor 26 so as to detect the steering direction of the steering wheel.

In S170, the deviation angle Δθ in the steering wheel operating direction between the actual position N of the steering wheel knob 18 and the target position No is computed. That is, the CPU 22 computes the actual position N of the steering wheel knob 18 on the basis of the count value Cn of the second counter 46, and computes the target position No of the steering wheel knob 18 on the basis of the counter conversion value Ck determined on the basis of the wheel angle R of the steered tire wheel 16. Further, the CPU 22 computes the deviation angle Δθ between the actual position N and the target position No as shown in FIG. 10.

In S180, it is judged whether or not the deviation angle Δθ is within 180° (Δθ≦180°). When the relation Δθ≦180° is established, the step proceeds to S190. When the relation Δθ≦180° is not established, the output command value Dm at that time is set to the final output command value Dmt in S195, and thereafter the step proceeds to S200.

In S190, the output command value Dm of the PS motor 36 is multiplied by the compensation lowering factor K. In the present embodiment, the output command value Dm to the PS motor 36 is multiplied by "0.5", and the final output command value Dmt which is 50% reduced is obtained as the result of multiplication.

In S200, the final output command value Dmt is output to the PS motor 36. When the output command value Dmt multiplied by the compensation lowering factor K is output as the final output command value Dmt, the output of the PS motor 36 is restricted to be small in comparison with the steering wheel operation, and the PS motor 36 rotates at a relatively low speed. As a result, the steering speed of the steered tire wheel 16 is delayed in comparison with the normal time (the compensation inhibiting time) with respect to the operating speed of the steering wheel 17, for example, substantially half reduced in comparison with the normal steering speed, whereby a racing state of the steering wheel 17 is generated. Accordingly, the actual position N catches up with the target position No, whereby the position deviation of the steering wheel knob 18 is cancelled. On the contrary, when the output command value Dmt is output as the final output command value Dmt in a state in which the compensation lowering factor K is not multiplied, the PS motor 36 is driven by the normal drive force.

A description will be given of the compensation of the steering wheel knob position at a time of turning around the corner as shown in FIG. 12. FIGS. 14(a), 14(b) and 14(c) are graphs showing aspects of change in the provisional output command value Dm, the compensation lowering factor K and the final output command value Dmt at a time of traveling around the curve. In this case, the provisional output command value Dm indicates a value which is determined by using the relation shown in FIG. 9 on the basis of the angle difference ΔH, and the final output command value Dmt indicates the value obtained by multiplying the provisional output command value Dm by the compensation lowering factor K (in this case, including K=1). In this case, in the graph of each of the output command values Dm and Dmt, "+" indicates a motor rightward rotation (a normal rotation) corresponding to the steering wheel rightward steering, and "−" indicates a motor leftward rotation (a reverse rotation) corresponding to the steering wheel leftward steering.

In the case where the vehicle turns right from the state of traveling straight as shown in FIG. 12, the steering wheel 17 is first steered rightward. On the assumption that the first counter at a time of traveling straight is "0", the value Ch of the first counter 45 is counted down together with starting the right steering. As the steering wheel 17 is operated and the angle difference ΔH becomes larger, the output command value Dm is increased as shown in FIG. 9. At a time of the rightward steering, the provisional output command value Dm shown in FIG. 14(a) is obtained.

When steering the steering wheel 17 rightward, the compensation of the steering wheel knob position is not executed during a period that the deviation angle Δθ in the steering wheel operating direction is over 180°. Accordingly, the provisional output command value Dm is not multiplied by the compensation lowering factor K=0.5, and the final output command value Dmt obtained by multiplying by K=1 is commanded.

Further, in the instant of turning back the steering wheel 17, the counter conversion value Ct determined on the basis of the wheel angle R is set to the first counter 45, whereby the ΔH becomes "0". Accordingly, in the instant of this turning back, the provisional and final output command values Dm and Dmt become "0", and the PS motor 36 is stopped. Further, when the steering wheel 17 is reversely operated in the leftward direction, the ΔH is counted up from "0" at this time, and as the steering wheel 17 is operated and the ΔH becomes larger, the provisional output command value Dm is also increased as shown in the relation in FIG. 9. At the leftward steering time, the provisional output command value Dm as shown in FIG. 14(a) is obtained.

Since the steering wheel operating direction becomes a direction moving from the actual position N to the target position No in a shortcut manner, and the deviation angle Δθ becomes equal to or less than 180° at a time of returning the steering wheel 17 after turning back, the compensation of the steering wheel knob position is executed. At this time, the final output command value Dmt is reduced to 50% of the normal value. Further, when returning the steering wheel 17 to the straight moving state, the driver fine operates the steering wheel 17 rightward and leftward for controlling the vehicle body in the straight traveling state. At this time, since the counter conversion value Ct determined on the basis of the wheel angle R is set to the first counter 45 so as to establish the relation ΔH=0 every time when the actual position N passes through the target position No, the output of the PS motor 36 is shut off for a moment. Accordingly, the straight moving stability with respect to the steering wheel operation can be secured. Therefore, as shown in FIGS. 14(a), 14(b) and 14(c), during the steering wheel fine operation after returning to the straight moving state, the PS motor 36 is shut off for a moment every time when the actual position passes through the target position.

When the steering wheel is fine operated during the straight traveling and the actual position N moves close to the target position No, the deviation angle is in the compensation allowing area (K=0.5), and when the actual position N finishes passing through the target position No, the deviation angle becomes in the compensation inhibiting area (K=1).

FIGS. 13(a) to 13(e) describe the steering control at a time of fine operating the steering wheel at the straight traveling time. For example, the final output command value Dmt at a time when operating the steering wheel 17 leftward from a left turn back point HL in FIG. 13(a) to a right turn back point HR in FIG. 13(e) at the steering wheel fine operating time is determined in the following manner.

(1) Since the counter conversion value Ct determined on the basis of the wheel angle R is set to the first counter 45 at a time of turning back the steering wheel 17 from the rightward steering to the leftward steering (the left turn back point HL), ΔH=0 is established, and the final output command value Dmt=0 is established (FIG. 13(a)).

(2) Since the process by which the actual position N of the knob moves close to the target knob position No is included in the compensation allowing area, the final output command value Dmt, that is, "0.5 Dm" is obtained by multiplying the output command value Dm determined on the basis of the angle difference ΔH increasing from the state in which ΔH=0 is set in the turn back point HL by K=0.5 (FIG. 13(b)).

(3) Since the relation ΔH=0 is set in the instant that both of the positions N and No coincide, at a time when the actual position N of the knob passes through the target position No, the final output command value Dmt becomes "0" (FIG. 13(c)).

(4) Since the process by which the actual position N moves apart from the target position No is included in the compensation inhibiting area, the output command value "Dm" determined on the basis of the angle difference ΔH increasing from the state in which ΔH=0 is set at a time when the actual position N coincides with the target knob position No becomes the final output command value Dmt as it is (FIG. 13(d)).

(5) Since the counter conversion value Ct determined on the basis of the wheel angle R is set to the first counter 45 at a time of turning back the steering wheel 17 from the leftward steering to the rightward steering (the right turn back point HR), the angle difference ΔH=0 is established, and the final output command value Dmt=0 is established (FIG. 13(e)).

FIGS. 15(a) and 15(b) are graphs describing the reason why the second compensation can ensure the straight moving operation stability. FIG. 15(a) shows an example in which the second compensation is executed, and FIG. 15(b) shows an example in which the second compensation is not executed.

In the case where the second compensation is not executed, for example, in the steering wheel leftward operating process, the angle difference ΔH is gradually increased from the left turn back point HL to the right turn back point HR, and the provisional output command value Dm drawing a chevron-shaped waveform as shown in an upper step of FIG. 15(b) is determined. At this time, since it is the compensation allowing area (K=0.5) before the actual position N passes through the target knob position No, and it is the compensation inhibiting area (K=1) after passing, the final output command value Dmt is 50% reduced at a front half portion of the chevron shape in the upper step, as shown in a lower step of FIG. 15(b), and when the actual position N passes through the target position No, the final output command value Dmt is suddenly increased. That is, a great difference is generated in the final output command value Dmt between front and rear of a boundary between the compensation allowing area and the compensation inhibiting area. Accordingly, even when the driver intends to fine operate the steering wheel 17, the PS motor 36 is going to have an excessive output after a time point that the compensation inhibiting area is started through a middle of the steering wheel fine operation range, and the wheel angle R of the steered tire wheel 16 becomes a little excessive against the driver's intention. This causes the straight traveling in a serpentine manner.

On the contrary, in the case of executing the second compensation, for example, in the steering wheel leftward operating process, the angle difference ΔH gradually increasing from the left turn back point HL becomes temporarily "0" at a time point that the actual position N passes through the target position No in the middle of the steering wheel fine operation range and both coincides, and the angle difference ΔH again increases from "0" from this time point. Accordingly, the provisional output command value Dm is determined so as to draw two small chevron waveforms shown in an upper step of FIG. 15(a). Since it is the compensation allowing area (K=0.5) before the actual position N passes through the target position No in the middle of getting to the point HR from the point HL and it is the compensation inhibiting area (K=1) after passing, only one front half chevron shape in the upper step is 50% reduced in the final output command value Dmt as shown in a lower step of FIG. 15(a).

However, since one rear half chevron shape is inherently small, it is hard to generate a great difference in the final output command value Dmt between the compensation allowing area and the compensation inhibiting area. Accordingly, an increase rate of the output command value Dm is reduced after the actual position N passes through the target knob position No and a sudden increasing property of the motor output value at a time of being switched from the compensation allowing area to the compensation inhibiting area is reduced. Therefore, even after entering into the compensation inhibiting area from the time point passing through the middle of the steering wheel fine operation range, the output of the PS motor 36 is not largely changed in comparison with that until that moment, and it is possible to obtain the straight moving operation stability in accordance with the intention of the driver.

As mentioned above, in accordance with the second compensation, for two reasons comprising a matter of setting ΔH to 0 so as to set the output of the PS motor 36 to "0" on a turning point moving from the compensation allowing area to the compensation inhibiting area, and a matter of returning (resetting) ΔH determining the output value of the compensation inhibiting area to a starting point "0", the straight moving operation stability can be ensured.

Accordingly, since the output command value Dm drops down to "0" every time when the actual position N coincides with the target position No during the steering wheel fine operation, the output value of the PS motor 36 does not suddenly increase even after the actual position N passes through the target position No, and the output difference of the PS motor 36 is reduced to be small before and after the actual position N passes through the target position No. Therefore, since the steering amount (the final output command value Dmt) of the steered tire wheel 16 with respect to the steering wheel operating amount (the angle difference ΔH) is comparatively stable during the steering wheel straight moving fine operation, it is easy to secure the straight traveling stability. For example, it is possible to prevent a disadvantage that the vehicle travels straight in a serpentine manner, for example, during the steering wheel fine operation. In particular, at a time of returning to the straight moving state after finishing turning around the curve, the steering wheel 17 is fine operated for controlling the vehicle body in the straight moving attitude, but it is possible to return to the stable straight moving state in a comparatively speedy manner on the basis of a little steering wheel fine operation.

Accordingly, the following effects can be obtained in this embodiment.

(1) When the steering wheel knob position compensation is executed, the first compensation is executed and the output command value Dm is reduced by a predetermined rate (K=0.5). Accordingly, since the output of the PS motor 36 is not set to 0 even during the steering wheel knob position compensation, the holding force of the steered tire wheel 16 can be secured. In the total hydraulic type steering apparatus, the holding force of the steered tire wheel is secured at a certain degree due to an existence of the working oil in the steering cylinder, but in the total electric type steering apparatus, the holding force of the steered tire wheel 16 is hard to be secured during the stop of the PS motor 36. However, since the output of the PS motor 36 is not set to 0 and outputs half of the normal output, the holding force of the steered tire wheel is secured. Therefore, even when the steered tire wheel 16 steps a stone or the like during the execution of the steering wheel knob position compensation and an external force is applied, it is possible to avoid the matter that the wheel angle R of the steered tire wheel 16 is changed, and it is possible to prevent the vehicle body 2 from becoming unstable due to the execution of the compensation.

(2) When the second compensation is executed during the steering wheel operation and the actual position N coincides with the target position No, the final output command value Dmt of the PS motor 36 is set to "0" and the PS motor 36 is stopped. Even when the state is switched from the compensation inhibiting state to the compensation allowing state during the steering wheel operation and the final output command value Dmt is twice increased from 0.5 Dm to Dm, the PS motor 36 stops for a moment at a time of switching, whereby the output difference of the PS motor 36 is reduced to be small before and after the switching. Accordingly, the straight moving stability with respect to the steering wheel operation can be secured. For example, at a time of returning to the straight moving state after finishing traveling around the curve, it is easy to avoid the matter that the straight traveling in the serpentine manner is generated.

(3) Further, in the second compensation, since the angle difference ΔH is set to 0 on the basis of the process of the first counter 45 at a time of being switched from the compensation inhibiting state to the compensation allowing state during the steering wheel operation, it is possible to further reduce the output difference of the PS motor 36 before and after the switching. As a result, the straight moving stability with respect to the steering wheel operation is further easily secured.

(4) Since the counter conversion value Ct in correspondence to the wheel angle R is set to the first counter 45 at a time of stopping the operation of the steering wheel 17 or turning back the steering wheel 17, the angle difference ΔH becomes 0 and the output of the PS motor 36 is dropped down. Accordingly, at a time of stopping the operation of the steering wheel or turning back the steering wheel, the steered tire wheel 16 which has been steered is stopped. Therefore, the steered tire wheel 16 is not steered at a degree corresponding to the operating amount even when the steering wheel 17 is rotated excessively, and it is possible to stop the steered tire wheel 16 at the same time when the operation of the steering wheel 17 is stopped. Accordingly, it is possible to avoid the problem that the steered tire wheel 16 keeps moving for a while immediately after the steering wheel operation is stopped, in spite that the operation of the steering wheel 17 is stopped. Further, at a time of turning back the steering wheel, the steered tire wheel 16 is immediately reversed so as to be steered in a reverse direction at the same time of turning back the steering wheel 17.

(5) Since the deviation angle Δθ of the steering wheel knob 18 is determined in accordance with a relative angle per one steering wheel rotation unit, the compensation can be executed at a half rotation deviation amount even if one and a half rotation is deviated.

(6) Since the compensation is executed only when the deviation angle Δθ is within 180° in a shortcut manner, it is possible to avoid expansion of the deviation by executing the steering wheel knob compensation.

(7) Since the output command value Dm is determined in correspondence to the difference angle ΔH, and the drive force (torque) of the PS motor 36 is controlled in correspondence to the difference angle ΔH, it is possible to achieve the steering wheel steering control of following the wheel angle to the steering wheel operating amount. Further, when detecting the stop of the steering wheel operation or the turning back, the counter conversion value Ct determined on the basis of the wheel angle R is set to the first counter 45 so as to forcibly set the difference angle ΔH to "0", and the PS motor 36 is stopped. Accordingly, in spite that the structure is made such that the output command value Dm of the PS motor 36 is determined in correspondence to the value of the difference angle ΔH, the steered tire wheel 16 is stopped immediately at a time when the steering wheel operation is stopped or turned back. Therefore, the wheel angle amount in proportion to the steering wheel operating amount is not steered by stopping the steering wheel operation even in the case of rotating the steering wheel 17 excessively, and the steering of the steered tire wheel 16 is stopped at the same time when the steering wheel operation is stopped. Accordingly, it is possible to avoid the problem that the steered tire wheel 16 keeps moving for a while immediately after stopping the steering wheel operation, in spite of stopping the steering wheel operation. Further, at a time of turning back the steering wheel, the steered tire wheel 16 is immediately reversed and steered in the reverse direction at the same time of turning back the steering wheel 17. Therefore, in the total electric type steering apparatus, it is possible to obtain the same steering wheel operation feeling as that of the steering apparatus in which the steering wheel and the steered tire wheel are mechanically connected, and it is possible to execute the steering in accordance with the intention of the driver at a time of stopping the steering wheel operation and turning back.

(8) Since the data of the link ratio "12" is stored in the EEPROM 25, for example, in the case where it is desired to change and set the link ratio in correspondence to types of motor vehicle or specifications, it is possible to easily set the link ratio suitable for the types of motor vehicle or the specifications, by changing the link ratio set to the EEPROM 25 before shipping in correspondence to the types of motor vehicle or the specifications. Of course, it is possible to change the link ratio after shipping the vehicles.

(9) In the case where the capacity of the PS motor 36 is insufficient and the steered tire wheel 16 can not follow the steering wheel 17, and in the case of continuously rotating the steering wheel 17 in a state in which the steered tire wheel 16 is restricted to an end, the knob position of the steering wheel 17 is deviated with respect to the wheel angle R. However, since the steering wheel knob position compensation is executed and the output of the PS motor 36 is reduced at a time of operating the steering wheel 17, whereby the steering wheel 17 is steered in a racing manner and catch up with the steered tire wheel 16, the deviation mentioned above is compensated. In particular, in the present embodiment, at a time of stopping the operation of the steering wheel 17 or turning back the steering wheel 17, a deviation is generated by forcibly setting the difference angle ΔH to 0 and stopping the output of the PS motor 36, but this kind of deviation can be compensated in accordance with the steering wheel knob position compensation. Accordingly, the steering wheel knob 18 is arranged at the normal position in correspondence to the wheel angle R of the steered tire wheel 16 at a high frequency, and it is possible to judge the wheel angle R substantially correctly, for example, even when the position of the steering wheel knob 18 is set to a target for judging the wheel angle R.

It should be apparent to those skilled in the art that the present invention may be embodied in many other specific forms without departing from the spirit or scope of the invention. Particularly, it should be understood that the invention may be embodied in the following forms.

In the embodiment mentioned above, ΔH is set to 0 at a time when the actual position passes through the target position, but it is possible to employ a method of dropping only the output command value of the PS motor 36 to "0" without setting ΔH to 0 at this time point. In this case, the provisional output command value is employed in the same manner as that in FIG. 15(*b*), but in the final output command value, since the output command value drops down to "0" at the turning point from the compensation area to the compensation inhibiting area in the graph in the lower step of FIG. 15(*b*), a time lag is generated until the PS motor 36 can achieve the output in correspondence to the actual command value in spite that the command value thereafter is high, so that the output of the PS motor 36 after entering into the compensation inhibiting area goes rusty. As a result, the output difference of the PS motor 36 is reduced to be small before and after being switched from the compensation allowance to the compensation inhibition.

Figure 16:
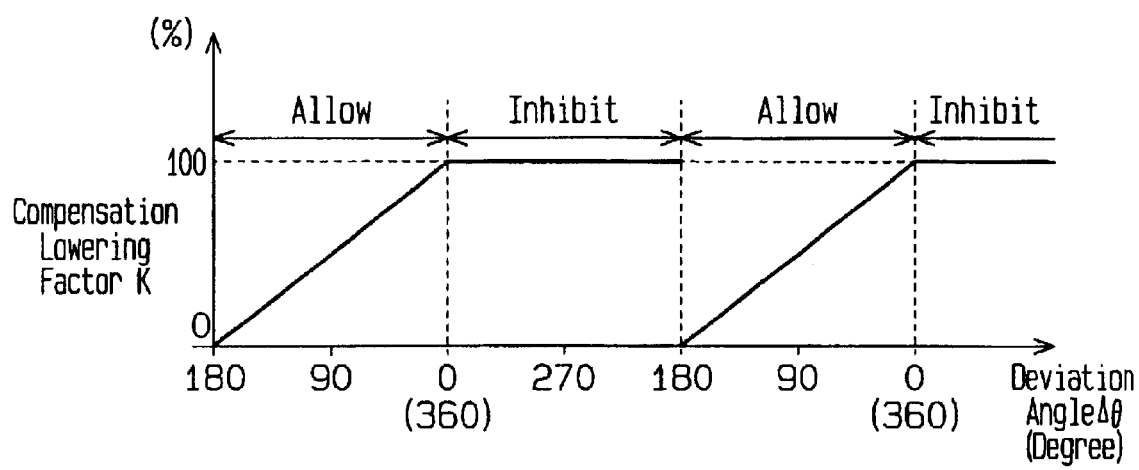
FIG. 16 is a graph showing a relation between the deviation angle and the compensation lowering factor in another example in accordance with the first embodiment.

The compensation lowering factor K is not limited to the fixed value (0.5). For example, the compensation lowering factor K may be set to a variable value. As shown in FIG. 16, it may be set to a value which increases as the deviation angle Δθ is reduced in the compensation allowing area. In accordance with this setting method, since the output command value Dm is only reduced at a predetermined rate during the steering wheel position compensation, the power of the PS motor 36 is transmitted to the steered tire wheel 16, although a little, and it is possible to secure the holding force of the steered tire wheel 16.

The compensation allowing area of the first compensation is not limited to the case where the deviation angle is within 180°, but may be any cases within 180°.

A restriction area of restricting the output to be small after the deviation in the position relation between the steering wheel and the steered tire wheel is cancelled so as to be switched to the compensation inhibiting area may be set. For example, the restriction area is set only to a predetermined area within the range of the straight moving operation area. As a method of restricting the output within the restriction area, there can be listed up a method of setting an upper limit value and restricting the output to a value in the range which is not over the upper limit value, a method of reducing, at a predetermined rate, the output and the like. Since the restriction of output is limited to such an extremely narrow range as an area within the range in the straight moving operation area, the output restriction hardly assist the deviation of the steering wheel.

The second compensation is not limited to the method of setting the output of the PS motor to 0 at the predetermined timing at which the deviation in the positional relation between the actual position of the steering wheel and the wheel angle of the steered tire wheel is cancelled. The output may be simply reduced at a predetermined rate.

The executing timing of the second compensation is not limited to the time point at which the deviation in the positional relation between the actual position of the steering wheel and the wheel angle of the steered tire wheel is cancelled. It may be timing a little before or after the time point at which the deviation is cancelled (timing at which the deviation is expected to be cancelled). Further, in the case of setting the allowable range of the deviation for a condition by which the steering wheel coincides with the steered tire wheel in the positional relation, in order to stop the compensation at a time when the deviation is within the allowable range, it is possible to execute the second compensation of stopping or reducing the power output of the drive means such as the PS motor or the like at an optional timing within the allowable range. Of course, if it is assumed that the deviation is cancelled and the output difference before and after being switched from the compensation area to the compensation inhibiting area is corrected (reduced) to be small, by introducing the output after inhibiting the compensation to be small or directly compensating the output to a small value, it is possible to execute the second compensation at a timing which is a little out of the allowable range. For example, it is possible to execute the second compensation in the compensation area, or it is possible to execute the second compensation in the compensation inhibiting area.

In the embodiment mentioned above, the second compensation is executed only in the instant that the steering wheel coincides with the steered tire wheel in the positional relation, but it is possible to give a range to the timing of executing the second compensation. For example, when the angle difference ΔH exists in the range 0°≦ΔH≦2°, the output is set to 0 or reduced to be small. In the case of giving the range to the timing of executing the second compensation, and in the case of executing the second compensation of setting the output to 0, it is preferable to make the range narrow at a certain degree so as to secure the holding force of the steered tire wheel. On the contrary, in the case of setting the range of the timing of executing the second compensation to be wide so that it is hard to secure the holding force of the steered tire wheel by setting the output to 0, the output may become 0 for a moment, but it is preferable to employ the second compensation in which the output is only reduced by a little. Of course, this range is not defined by the angle, but may be defined by the time.

Even in the structure of determining the output in correspondence to the steering wheel operating speed, the second compensation can be executed by forcibly setting the output to 0 or reducing the output even when the steering wheel operating speed gets a certain value at the timing when it is assumed that the deviation is cancelled so as to be switched from the compensation area to the compensation inhibiting area.

The second compensation is not limited to the method of resetting the angle difference ΔH corresponding to a parameter determining the output (the output command value) to 0. For example, it is possible to employ a method of resetting the angle difference ΔH to a starting value previously set for the second compensation. In this case, the output command value Dm in FIG. 15(a) does not become "0" but becomes the starting value Do (Do>0). In this case, the starting value is set so as to become a smaller value than the output value at a time when the compensation is applied during the straight moving fine operation of the steering wheel. For example, the starting value can be set to a variable value which is set to a smaller lowering rate than a lowering rate during the conventional compensation, and is set to a value Do (a starting value Do=Ko·Dm, in this case, Ko<0.5) obtained by multiplying the Dm value by a factor Ko smaller than the compensation lowering factor K=0.5 during the compensation in the embodiment mentioned above.

The second compensation is not a process (for example, reset) of changing the parameter (for example, the angle difference ΔH) determining the output value of the drive means such as the PS motor or the like, but may be a process of stopping the power output of the drive means for a moment or reducing the output at a predetermined timing in which the steering wheel simply coincides with the steered tire wheel in the positional relation independent from the parameter.

The steering wheel position compensation is not limited to the method of moving the actual position of the steering wheel 17 close to the target position determined on the basis of the wheel angle R of the steered tire wheel 16. For example, it is possible to employ a method of determining the target tire angle on the basis of the steering wheel angle of the steering wheel 17 and moving the actual tire angle close to the target tire angle.

The actual position N of the steering wheel 17 and the target knob position No are not limited to be computed by the relative angle between 0° and 360°, and may be computed by an absolute angle. For example, in the present embodiment, the actual position N and the target knob position No may be computed by the absolute angle within the range of between −1080° and +1080°.

The total electric steering apparatus is not limited to the structure in which the output command value driving the steered tire wheel 16 is determined on the basis of the angle difference ΔH between the steering wheel angle H and the steering wheel conversion value Ht. For example, it is possible to employ a drive method of determining the output command value of the PS motor 36 on the basis of the steering wheel operating speed. That is, the steered tire wheel 16 is steered by computing the output command value Dm on the basis of the steering wheel operating speed and driving the PS motor 36 by the drive force in correspondence to the output command value Dm.

The steering apparatus to which the steering wheel position compensating apparatus is applied is not limited to the total electric type. For example, the steering wheel position compensating apparatus can be applied to the total hydraulic type steering apparatus in which the steered tire wheel is steered by supplying the working oil in correspondence to the operating amount of the steering wheel to the steering cylinder (PS cylinder). In this case, the structure is limited to one to which the second compensation is applied. For example, the electromagnetic control valve is opened at the timing of executing the second compensation and the opening degree is made larger than the opening degree at the compensating time. For example, the electromagnetic control valve is fully opened. In this case, in the case of this total hydraulic type steering apparatus, the drive means is constituted by the steering cylinder, and the compensating means is constituted by an electromagnetic control valve for flowing back the working oil, a controller for controlling the electromagnetic control valve, and the like.

It is not limited that the steering wheel knob 18 is always provided in the steering wheel 17, and the steering wheel 17 may be one without a knob.

The industrial vehicle is not limited to the order picking type forklift 1, and may employ the other type such as a counter balance type or reach type of forklift. Further, the steering wheel knob position compensation control in accordance with the present embodiment is not limited to be used in the industrial vehicle, but may be used in the vehicle such as a motor vehicle or the like.

It is possible to compute and process the detection value of the steering wheel angle obtained by using the potentiometer or the like every time by the CPU so as to determine a value (a steering wheel angle) for computing the output command value.

The link ratio is not always limited to be a fixed value. For example, it is possible to vary by a little the value of the link ratio in a partial area or all the area in correspondence to the magnitude of the difference angle Δ.

In the embodiment mentioned above, the first counter 45 constitutes the steering wheel angle detecting means (computes the value of the steering wheel angle), but a stop process may be executed by using a counter which is independently prepared from the steering wheel angle detecting means. For example, in the case of using the potentiometer as the steering wheel angle sensor, the counter is, of course, unnecessary, but even in this case, a counter corresponding to storing means is prepared for computing the output command value. Further, at a time of stopping the steering wheel operation or turning back the steering wheel, the counter conversion value Ct determined on the basis of the wheel angle R is set to the counter so as to set the relation difference angle ΔH=0. In this case, the counter corresponding to the storing means is used for determining the difference angle ΔH. Of course, the storing means is not limited to the counter, but may employ a structure utilizing a predetermined memory area of a rewritable memory such as the RAM 24, the EEPROM 25 and the like.

The storing means and the counter which are used in the stop process may store or count either of the steering wheel angle and the wheel angle. For example, it is possible to employ a method of preparing a counter for counting the wheel angle and setting a counter conversion value in which the steering wheel angle is converted into the wheel angle to the counter, thereby setting the difference angle ΔR to 0. Further, it is possible to employ a method of counting both of the steering wheel angle and the wheel angle by two counters and aligning a counted value in one counter with a counted value in another counter, thereby setting the difference angle ΔH or ΔR to 0. In accordance with these methods, since the difference angle ΔH or ΔR becomes 0, the output command value determined on the basis thereof is set to 0, and the drive of the PS motor 36 is stopped.

The structure is not limited to the structure of determining the output command value driving the steered tire wheel 16 on the basis of the difference angle ΔH between the steering wheel angle H and the steering wheel conversion value Ht. It is possible to use a parameter (having the same dimension as that of the operation amount or the angle amount) in correspondence to the operation amount (or the angle amount), in which the steered tire wheel is steered and controlled in accordance with the link ratio with respect to the steering wheel operation except the steering wheel operating speed.

The steering apparatus to which the steering wheel position compensating apparatus is applied is not limited to the total electric type. For example, it is possible to apply to a steering apparatus for controlling an amount of oil supplied to the steering cylinder (the PS cylinder) by controlling the electromagnetic control valve (for example, an electromagnetic proportion valve), on the basis of a signal detecting the operating amount of the steering wheel. Of course, it is possible to apply to a steering apparatus in which in place of the electromagnetic control valve, an electric motor for driving a hydraulic pump supplying the working oil to the steering cylinder is set to the drive means (electric type drive means). In these cases, the steering wheel angle compensation executes a control of adjusting an opening degree of the electromagnetic control valve and controlling a rotational speed of the electric motor so as to delay the steering speed of the steered tire wheel with respect to the operating speed of the steering wheel. Further, in the case of executing the second compensation, the electromagnetic control valve is opened and the opening degree thereof is made larger than the opening degree at the compensating time. The rotational speed of the electric motor is made slower than the speed at the compensating time. In this case, in the case of the steering apparatus, the drive means is constituted by the electromagnetic control valve or the electric motor in addition to the steering cylinder, and the control means and the stopping means are constituted by the controller or the like.

Next, a description will be given of a forklift in accordance with a second embodiment obtained by embodying the present invention with reference to FIGS. 17 to 19, mainly in view of a difference from the forklift in accordance with the first embodiment. In this case, the same reference numerals are attached to the same elements as those in the first embodiment, and a detailed description thereof will be omitted.

Figure 17:
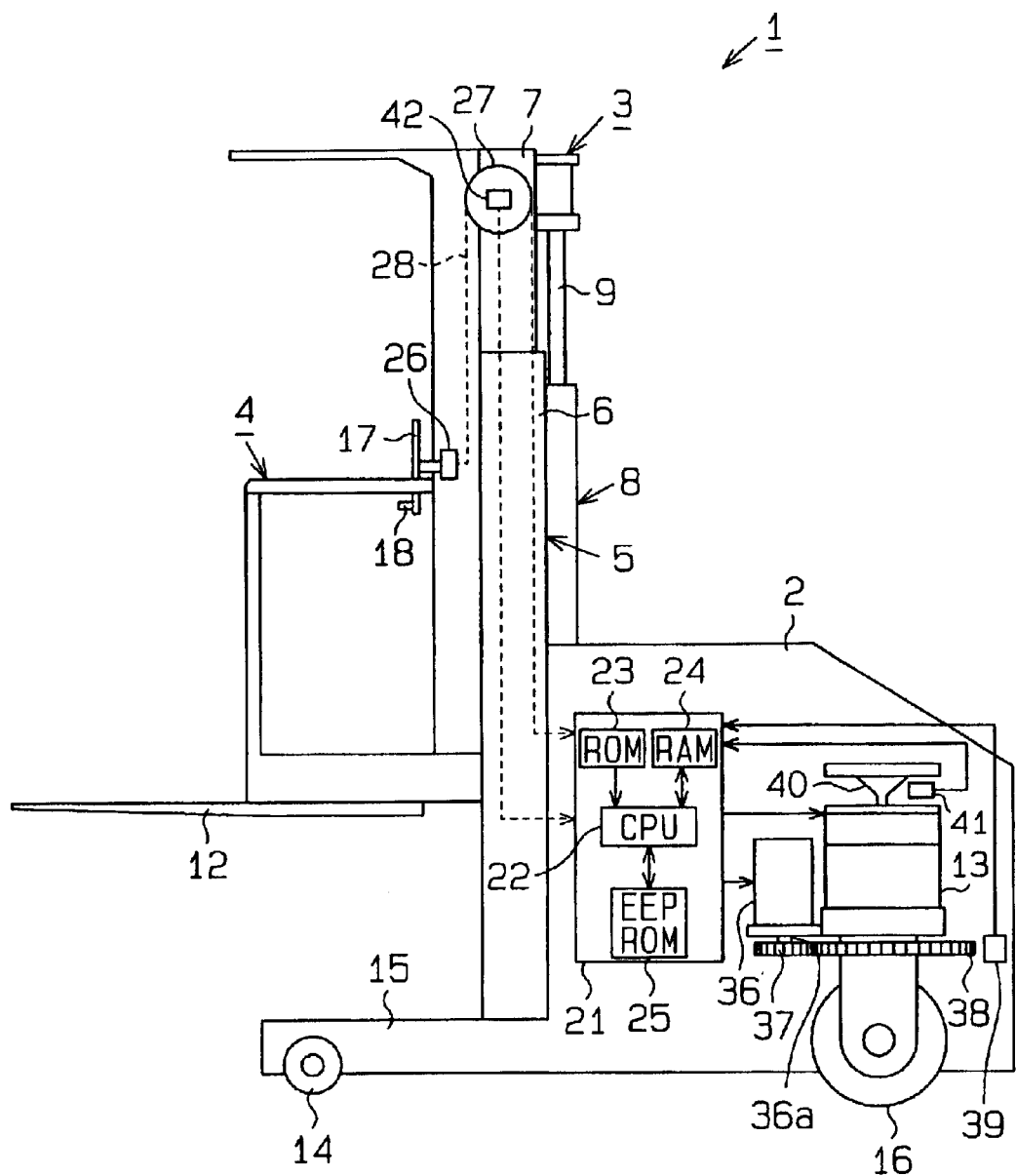
FIG. 17 is a view of an electric circuit for a forklift in accordance with a second embodiment.
Figure 18:
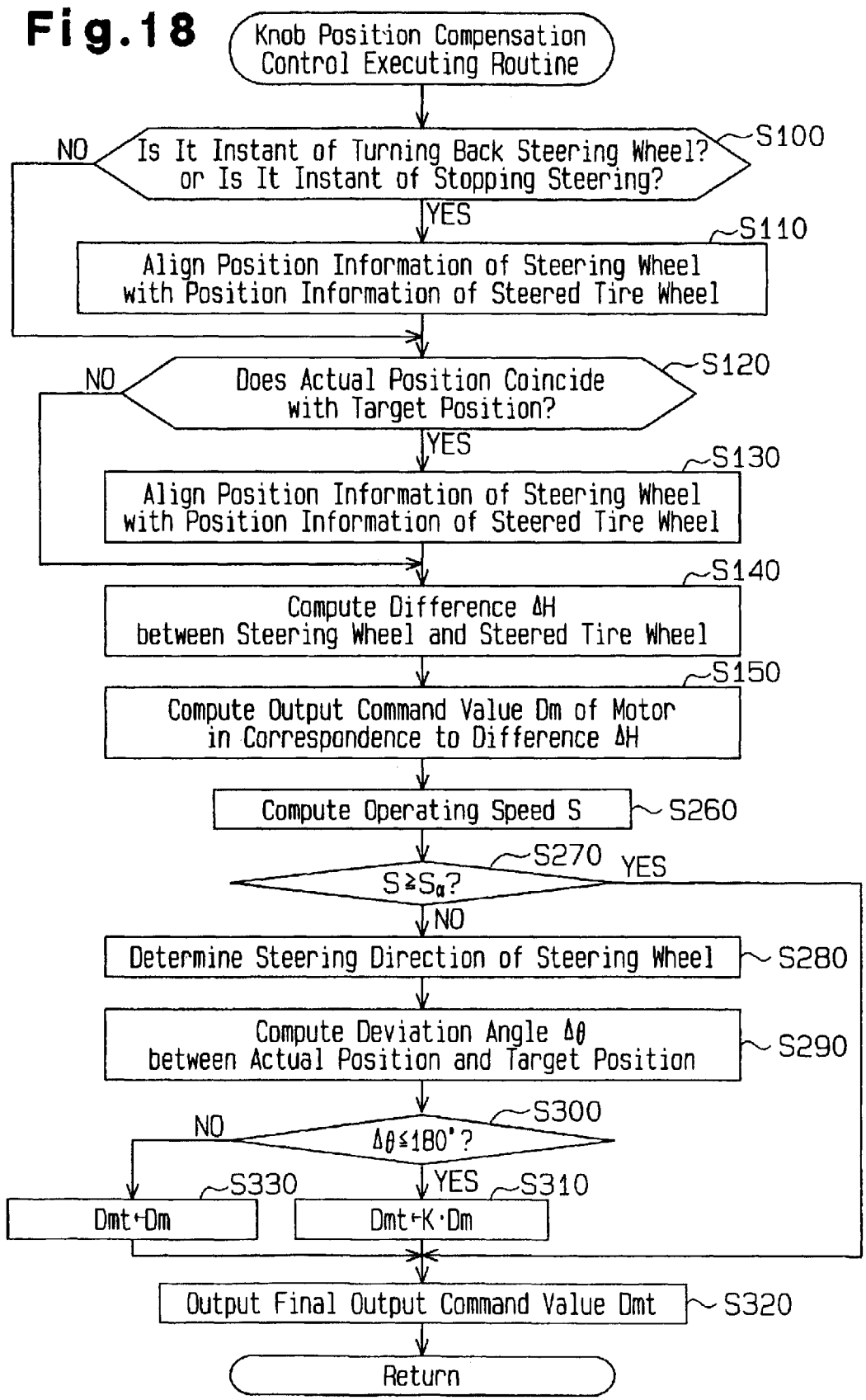
FIG. 18 is a flow chart executed at a time of executing a knob position compensating control.

As shown in FIG. 17, a height sensor 42 constituted by a rotary encoder is mounted to the pulley 27 mounted to an upper portion of the inner mast 7, and the height sensor 42 outputs a detection signal (a pulse signal) in proportion to the rotational amount of the pulley 27. Then, the CPU 22 counts a pulse of the detection signal output from the height sensor 42, thereby computing a height Y of the forklift 12 (the driver's stand 4). In this case, the CPU 22 increments the count value of the pulse obtained by the height sensor 42 at a time when the driver's stand 4b ascends, and decrements at a time of descending.

Further, the CPU 22 inhibits the steering wheel knob position compensation control at a time when a steering wheel operating speed S determined on the basis of the steering wheel angle sensor 26 becomes over a threshold value (a set value) Sa. That is, the CPU 22 inhibits the first compensation at a time when the steering wheel operating speed S becomes over the predetermined threshold value Sa, and outputs the output command value Dm computed in correspondence to the difference angle ΔH between the steering wheel 17 and the steered tire wheel 16 as it is, without multiplying the compensation lowering factor K by the output command value Dm. Accordingly, at a time when the steering wheel knob position compensation is inhibited, the PS motor 36 is driven on the basis of the normal output command value Dm which is not multiplied by the compensation lowering factor K. In this case, in the present embodiment, the threshold value Sa is set to 2.0 (rps), and the first compensation is inhibited at a time when the steering wheel operating speed S becomes equal to or more than the threshold value Sa.

Next, a description will be given of a processing procedure which the CPU 22 executes at a time of executing the compensation control of the steering wheel knob position, with reference to FIG. 18, mainly in view of a difference from the first embodiment.

In S260, the steering wheel operating speed S is computed. That is, the CPU 22 computes the steering wheel operating speed S by determining the pulse interval time on the basis of the detection signal output from the steering wheel angle sensor 26.

In S270, it is judged whether or not the steering wheel operating speed S is equal to or more than the threshold value Sa (S≧Sa). When the relation S≧Sa is not established, the step proceeds to S280, and when the relation S≧Sa is established, the step proceeds to S320 and the output command value Dm computed in S150 is output as the final output command value Dmt as it is.

In S280, the operating direction of the steering wheel 17 is determined. That is, the CPU 22 compares and processes two pulse signals having deviated phases which are input from the steering wheel angle sensor 26 so as to detect the operating direction of the steering wheel 17. Then, it is detected whether the steering wheel 17 is steered rightward or leftward.

In S290, the deviation angle Δθ in the steering wheel operating direction between the actual position N of the steering wheel knob 18 and the target position No is computed. That is, the CPU 22 computes the actual position N of the steering wheel knob 18 on the basis of the count value Cn of the second counter 46, and computes the target position No of the steering wheel knob 18 on the basis of the counter conversion value Ck determined on the basis of the wheel angle R of the steered tire wheel 16. Further, as shown in FIG. 10, the CPU 22 computes the deviation angle Δθ along the operating direction of the steering wheel 17 between the actual position N and the target position No.

In S300, it is judged whether or not the deviation angle Δθ in the steering wheel operating direction is within 180° (Δθ≦180°). When the relation Δθ≦180° is established, the step proceeds to S310 and when the relation Δθ≦180° is not established, the step proceeds to S330, and the output command value Dm determined in S150 is set to the final output command value Dmt as it is.

In S310, the final output command value Dmt is determined by multiplying the output command value Dm of the PS motor 36 by the compensation lowering factor K. In the present embodiment, the output command value Dm to the PS motor 36 is multiplied by "0.5", and the 50% reduced final output command value Dmt is obtained as the result of multiplication.

In S320, the final output command value Dmt is output to the PS motor 36. That is, when the output command value Dm multiplied by the compensation lowering factor K is output as the final output command value Dmt, the PS motor 36 rotates at a low speed and the steered tire wheel 16 is steered. Accordingly, the output of the PS motor 36 is restricted with respect to the steering wheel operation, and the actual position N catches up with the target position No, whereby the deviation of the steering wheel knob 18 is cancelled. On the contrary, when the output command value Dm which is not multiplied by the compensation lowering factor K is output as the final output command value Dmt, the PS motor 36 is driven on the basis of the normal drive force.

In this case, there is a case of rotating the steering wheel 17 at a high speed so as to steer the forklift 1 urgently due to the shape of the traveling road surface, the obstacle or the like. When executing the first compensation under this condition so as to reduce the output of the PS motor 36, there is generated a state in which the steered tire wheel 16 is not sufficiently steered in spite of rotating the steering wheel 17.

However, the structure is made such as to set the threshold value Sa of the operating speed capable of assuming that the steering wheel 17 is rotated at a high speed and inhibit the compensation of the steering wheel knob position at a time when the steering wheel operating speed S becomes equal to or more than the threshold value Sa. Accordingly, since the normal output command value Dm is output to the PS motor 36 in the case of urgently steering the forklift 1, the output of the PS motor 36 is not reduced, and the following property of the steered tire wheel 16 is secured with respect to the operation of the steering wheel 17.

Further, in the case of largely turning the steered tire wheel 16 from one end to another end, there is a case of operating the steering wheel 17 at a high speed. At this time, when the first compensation is executed and the output of the PS motor 36 is reduced, there is generated a necessity of operating the steering wheel 17 more and a lot of time is required for steering the steered tire wheel 16, so that an operability at a time of operating the steering wheel is deteriorated. However, since the first compensation is inhibited at a time when the steering wheel operating speed S becomes equal to or more than the threshold value Sa, it is possible to secure the following property of the steered tire wheel 16 with respect to the steering wheel operation in the case of largely turning the steered tire wheel 16, and it is possible to secure an operability at a time of operating the steering wheel.

Figure 19:
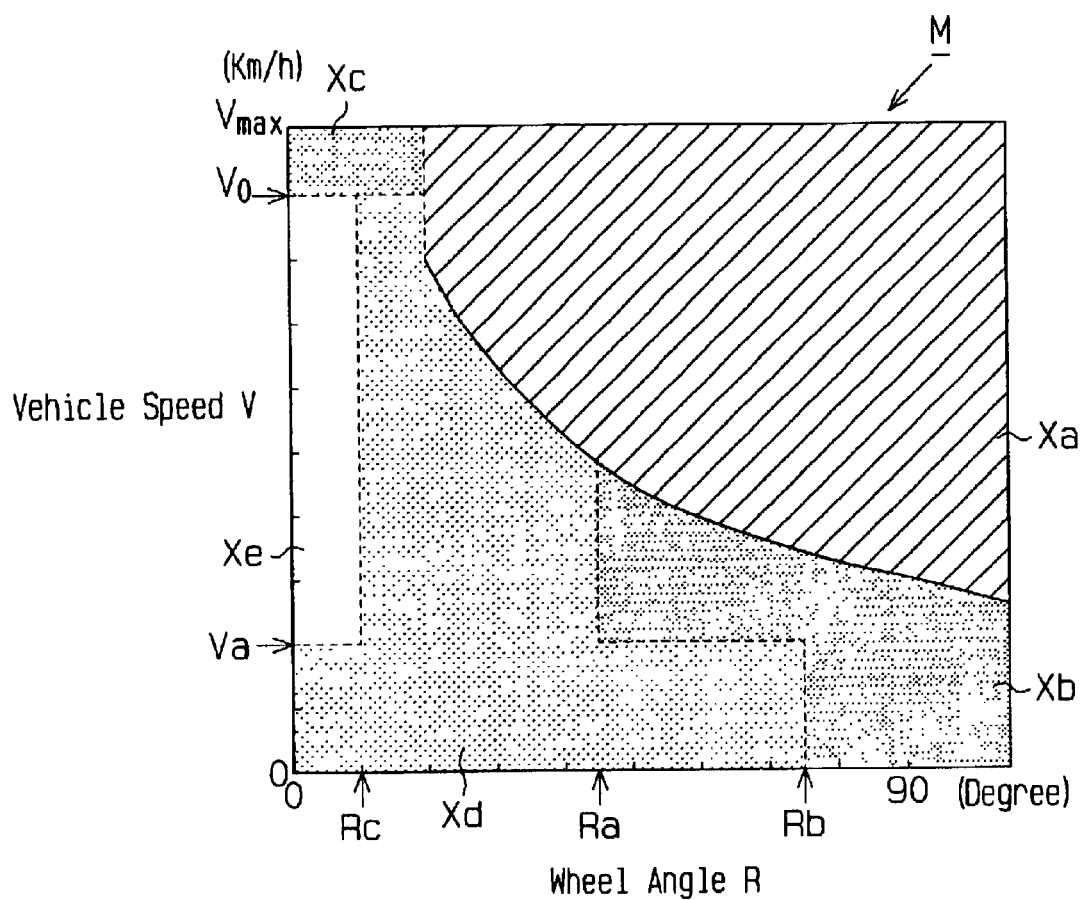
FIG. 19 is a map for inhibiting a compensation of a steering wheel knob position.

FIG. 19 is a map for determining whether or not the compensation of the steering wheel knob position is inhibited. A map M shown in FIG. 19 is stored in the ROM 23. In this map M, a parameter in a horizontal axis is set to the wheel angle R, and a parameter of a vertical axis is set to the vehicle speed V. The CPU 22 judges with reference to the map M whether or not the compensation (the first compensation and the second compensation) of the steering wheel knob position is inhibited. When a coordinate (V, R) on the map M which is determined by two parameters comprising the vehicle speed V and the wheel angle R is positioned in the compensation inhibiting area, the compensation of the steering wheel knob position is inhibited. In this compensation inhibiting area, there are set two kinds of areas comprising an area which inhibits both of the first compensation and the second compensation, and an area which inhibits only the first compensation. In this case, a maximum vehicle speed Vmax is set to about 9.0 (km/h) in the present embodiment.

A threshold value Go of a lateral acceleration G is set in the map M, and an area in which the lateral acceleration G is over the threshold value Go on the map M is set to a compensation inhibiting area Xa. In this compensation inhibiting area Xa, it is set so as to inhibit both of the first compensation and the second compensation. That is, in the case where the coordinate (V, R) on the map M which is determined on the basis of the parameters comprising the vehicle speed V and the wheel angle R is in the compensation inhibiting area Xa, the first compensation and the second compensation are inhibited.

On the contrary, the lateral acceleration G is expressed by the following formula in the case of setting a vehicle turning radius determined on the basis of the wheel angle R to r.

$$G=V^2/r$$

Accordingly, the lateral acceleration G is definitely determined by the vehicle speed V and the wheel angle R, and an area (V, R) in which the lateral acceleration G is over the threshold value Go and a relation $V^2/r>Go$ is established is set to a compensation inhibiting area Xa.

Accordingly, in the case where the lateral acceleration G becomes equal to or more than the threshold value Go, for example, at a time of curving the forklift 1 substantially at 90°, both of the first compensation and the second compensation are inhibited. Therefore, the output of the PS motor 36 is not reduced, and the holding force of the steered tire wheel 16 is secured even when a large external force is applied to the steered tire wheel 16 from the traveling road surface due to the lateral acceleration G. Further, since the holding force of the steered tire wheel 16 is secured even when a large lateral acceleration G is applied to the vehicle body 2, it is possible to prevent the vehicle body 2 from being unstable.

Further, since there is a risk that a comparatively large external force is applied to the steered tire wheel 16 and the vehicle body 2 becomes unstable in the area of traveling the forklift 1 around the curve, even in the case where the coordinate (V, R) is beyond the range of the compensation inhibiting area Xa, the map M sets a compensation inhibiting area Xb for inhibiting the first compensation. That is, in the area which is lower than the threshold value Go of the lateral acceleration G, an area in which the vehicle speed V is over the threshold value Va (Va<Vo) and the wheel angle R is over the threshold value Ra, and an area in which the wheel angle R is over the threshold value Rb (Rb>Ra) are set in the compensation inhibiting area Xb, and in the case where the coordinate (V, R) on the map M is in the compensation inhibiting area Xb, the first compensation is inhibited.

In this compensation inhibiting area Xb, the area which is over the threshold value Va and the threshold value Ra corresponds to a case in which the forklift 1 travels around the curve substantially at 90°. Further, since the first compensation is inhibited in the compensation inhibiting area Xb, the holding force of the steered tire wheel 16 is secured even when a large external force is applied to the steered tire wheel 16 from the traveling road surface due to the curve traveling. Further, it is possible to secure the following property of the steered tire wheel 16 with respect to the operation of the steering wheel 17, and it is possible to travel around the curve having a turning radius which the driver intends.

Further, in the compensation inhibiting area Xb, the area in which the wheel angle R is over the threshold value Rb is in a state in which the steered tire wheel 16 is steered substantially close to an end. Accordingly, the holding force of the steered tire wheel 16 can be secured even when a large external force is applied to the steered tire wheel 16 from the traveling road surface for the reason that the steered tire wheel 16 is turned at a large wheel angle R. Further, it is possible to secure the following property of the steered tire wheel 16 with respect to the operation of the steering wheel 17 at a time when the steered tire wheel 16 is close to the end.

The map M is set so as to inhibit the first compensation in the high speed traveling area in which the vehicle speed V is over the threshold value Vo, even when the value on the map M is beyond the range of the compensation inhibiting area Xa. That is, an area in which the vehicle speed V is over Vo is set to a compensation inhibiting area Xc, and the first compensation is inhibited in the case where the coordinate (V, R) on the map M is in the compensation inhibiting area Xc. Accordingly, even when traveling substantially straight at a high speed, the following property of the steered tire wheel 16 with respect to the operation of the steering wheel 17 can be secured, and the forward moving direction of the vehicle can be changed at an angle intended by the driver.

Further, an area in which the vehicle speed V is in a range of the threshold value Va to Vo, and the wheel angle R is equal to or lower than the threshold value Rc (Rc<Ra) is set to an area Xe in which the compensation of the steering wheel knob position is not inhibited. At this time, in a compensation inhibiting area Xd except the compensation inhibiting areas Xa, Xb, Xc and Xe, it is set so as to inhibit the first compensation at a time when the steering wheel operating speed S is under the threshold value (the set value) So. In this case, in the present embodiment, the threshold value So is set to about 0.5 (rps), and the first compensation is inhibited at a time when the steering wheel operating speed S becomes equal to or less than the threshold value So.

This is because of preventing a matter that a slow steering of the steered tire wheel 16 can not be executed, if the first compensation is executed and the output of the PS motor 36 is reduced, at a time when the steering wheel 17 is required to be slowly operated at the traveling time. In this case, since the area Xe is an area in which the wheel angle R is assumed to be substantially "0", and a vehicle unstable element does not exist, the area Xe corresponds to an area in which both of the first compensation and the second compensation can be executed.

Accordingly, this embodiment can obtain the following effects.

(1) Since the structure is made such as to inhibit the steering wheel knob position compensation at a time when the steering wheel operating speed S becomes equal to or more than the threshold value Sa, the output of the PS motor 36 is not reduced at a time of urgently steering the forklift 1, the steered tire wheel 16 can be steered with a good response with respect to the operation of the steering wheel 17, and it is possible to secure the following property of the steered tire wheel 16 with respect to the steering wheel 17. Further, even in the case where the steering wheel 17 is operated at a high speed at a time of largely turning the steered tire wheel 16 from one end to another end, the following property of the steered tire wheel 16 with respect to the steering wheel operation is secured, whereby the operating time of the steering wheel 17 is not extended, and it is possible to secure the operability at a time of operating the steering wheel. Further, a great reaction force is relatively applied to the steered tire wheel 16 from the traveling road surface at a time of urgently steering, but the holding force of the steered tire wheel 16 can be secured, so that it is possible to prevent the vehicle body 2 from being unstable by inhibiting the steering wheel knob position compensation.

(2) Sine the first compensation is inhibited in the compensation inhibiting area Xc in which the vehicle speed V is over the threshold value Vo and the vehicle travels substantially in the straight moving state, the output of the PS motor 36 is not reduced in the high speed state. Accordingly, for example, even when operating the steering wheel 17 at the high speed traveling time, the following property of the steered tire wheel 16 with respect to the operation of the steering wheel 17 can be secured, and it is possible to steer the steered tire wheel 16 in accordance with the intention of the driver.

(3) In the compensation inhibiting area Xd, since the first compensation is inhibited at a time when the steering wheel operating speed S becomes equal to or less than the threshold value So, that is, at a time of slowly operating the steering wheel 17, it is possible to slowly steer the steered tire wheel 16 in correspondence to the slow operation of the steering wheel 17.

(4) Since the steering wheel 17 is not mechanically connected to the steered tire wheel 16 in the total electric type steering apparatus, the steering wheel 17 freely rotates even when the steered tire wheel 16 is positioned at the end, so that the actual position N of the knob in the steering wheel 17 is easily deviated with respect to the target position No. In the present embodiment, since the compensation of the steering wheel knob position can be executed by reducing the output of the PS motor 36 for canceling the deviation, and the compensation of the knob position is inhibited at a time when the steering wheel operating speed S becomes equal to or more than the threshold value Sa, it is possible to secure the following property of the steered tire wheel 16 with respect to the steering wheel operation at a time of urgently steering the forklift 1.

(5) In the compensation inhibiting area Xa in which the lateral acceleration G is over the threshold value Go, both of the first compensation and the second compensation are inhibited. Accordingly, the output of the PS motor 36 is not reduced in the unstable state in which the lateral acceleration G of the vehicle 2 is large, the holding force of the steered tire wheel 16 is secured, and it is possible to prevent the vehicle body 2 from being unstable.

(6) Since the first compensation is inhibited in the compensation inhibiting area Xb, it is possible to secure the following property of the steered tire wheel 16 with respect to the steering wheel operation, in the case where the vehicle travels around the curve or the steered tire wheel 16 is close to the end.

In this case, the embodiment is not limited to the structure mentioned above, and it may be modified, for example, as follows.

The value of the threshold value Sa is not limited to 2.0 (rps), may freely select any other values than 2.0, for example, 1.8, 2.3 and the like. That is, the threshold value Sa may be set to a value within a range of between 1.5 and 2.5 rps that the steering wheel 17 can be assumed to be operated at a relatively high operating speed if the steering wheel operating speed S becomes equal to or more than the threshold value Sa.

The structure is not limited to the case in which the first compensation is inhibited in both of the time when the steering wheel operating speed S becomes equal to or more than the threshold value Sa and becomes equal to less than the threshold value So. That is, the structure may be made such that the first compensation is inhibited only at a time when the steering wheel operating speed S becomes equal to or more than the threshold value Sa.

The steering wheel knob position compensation which is inhibited at a time when the steering wheel operating speed S becomes equal to or more than the threshold value Sa is not limited to the first compensation, but both of the first compensation and the second compensation may be inhibited. Further, the method of the steering wheel knob position compensation is not particularly limited as far as the steering wheel knob position compensation cancels the deviation in the positional relation between the steering wheel 17 and the steered tire wheel 16.

The range on the map M of the compensation inhibiting area Xb is not limited to the embodiment, but the setting may be changed by changing the values of the threshold values Ra, Rb and Va. Further, the range on the map M of the compensation inhibiting area Xc is not limited to the embodiment, but the setting of the compensation inhibiting range may be changed by changing the value of the threshold value Vo.

In the compensation inhibiting area Xa, the structure is not limited to the matter that both of the first compensation and the second compensation are inhibited, but any one of the first compensation and the second compensation may be inhibited.

In the compensation inhibiting areas Xb, Xc and Xd, the structure is not limited to the matter that only the first compensation is inhibited, but the structure may be made such as to inhibit both of the first compensation and the second compensation. On the contrary, the structure may be made such that the first compensation is not inhibited in the compensation inhibiting areas Xb, Xc and Xd.

Judgement whether or not the steering wheel 17 is slowly steered is not limited to be executed in the compensation inhibiting area Xd, but may be executed in the other compensation inhibiting areas such as Xa, Xb, Xc or the like.

The compensation lowering factor K is not limited to the fixed value (0.5). For example, as shown in FIG. 13, the compensation lowering factor K may be set to a value increasing in correspondence that the deviation angle $\Delta\theta$ is reduced in the compensation allowing area with a proportional relation.

The compensation lowering factor K is not limited to "0.5", and the link ratio is not limited to "12". That is, it can be set to the other values than the above by rewriting these values stored in the EEPROM 25.

The compensation allowing area of the first compensation is not limited to the case in which the deviation angle $\Delta\theta$ is within 180°, but may be set to the case having an optional value within 180°.

The structure is made to inhibit the steering wheel knob position compensation in the case where the deviation angle $\Delta\theta$ becomes over 180°, but the structure may be made such as to execute the knob position compensation even under the condition.

The steering wheel position compensation is not limited to the method of getting the actual position N of the knob in the steering wheel 17 close to the target position No of the knob determined on the basis of the wheel angle R of the steered tire wheel 16. For example, it is possible to employ a method of determining the target tire angle on the basis of the steering wheel angle of the steering wheel 17 and getting the actual tire angle close to the target tire angle.

The total electric type steering apparatus is not limited to the structure of driving the steered tire wheel 16 on the basis of the difference angle $\Delta H$ between the steering wheel angle H and the steering wheel conversion value Ht. For example, it is possible to employ a structure made such that the PS motor 36 is driven on the basis of the steering wheel operating speed S and the steered tire wheel 16 is steered. That is, the structure may be made such that the output command value Dm is computed on the basis of the steering wheel operating speed S, and the PS motor 36 is rotated by the drive force in correspondence to the output command value Dm, whereby the steered tire wheel 16 is steered.

The actual position N of the steering wheel 17 and the target position No are not limited to be computed on the basis of the relative angle between 0° and 360°, but may be computed on the basis of the absolute angle. For example, in the present embodiment, the actual position N and the target position No may be computed on the basis of the absolute angle within the range of between −1080° and +1080°.

The steering apparatus for steering the steered tire wheel 16 is not limited to the total electric type, but may be, for example, of a total hydraulic type of supplying the working oil in correspondence to the operating amount of the steering wheel to the steering cylinder so as to steer the steered tire wheel.

The steering wheel knob 18 is provided in the steering wheel 17, but the position compensation in accordance with the present embodiment may be employed in the vehicle in which the steering wheel having no steering wheel knob is mounted.

The industrial vehicle is not limited to the order picking type forklift 1, but may be the other types of forklifts such as a counter balance type forklift, a reach type forklift and the like. Further, the steering wheel position compensation control in accordance with the present embodiment is not limited to be used in the industrial vehicle, but may be used in the vehicle such as the motor vehicle or the like.

Next, a description will be given of a forklift in accordance with a third embodiment obtained by embodying the present invention with reference to FIG. 20, mainly in view of different points from the forklift in accordance with the second embodiment.

Figure 20:
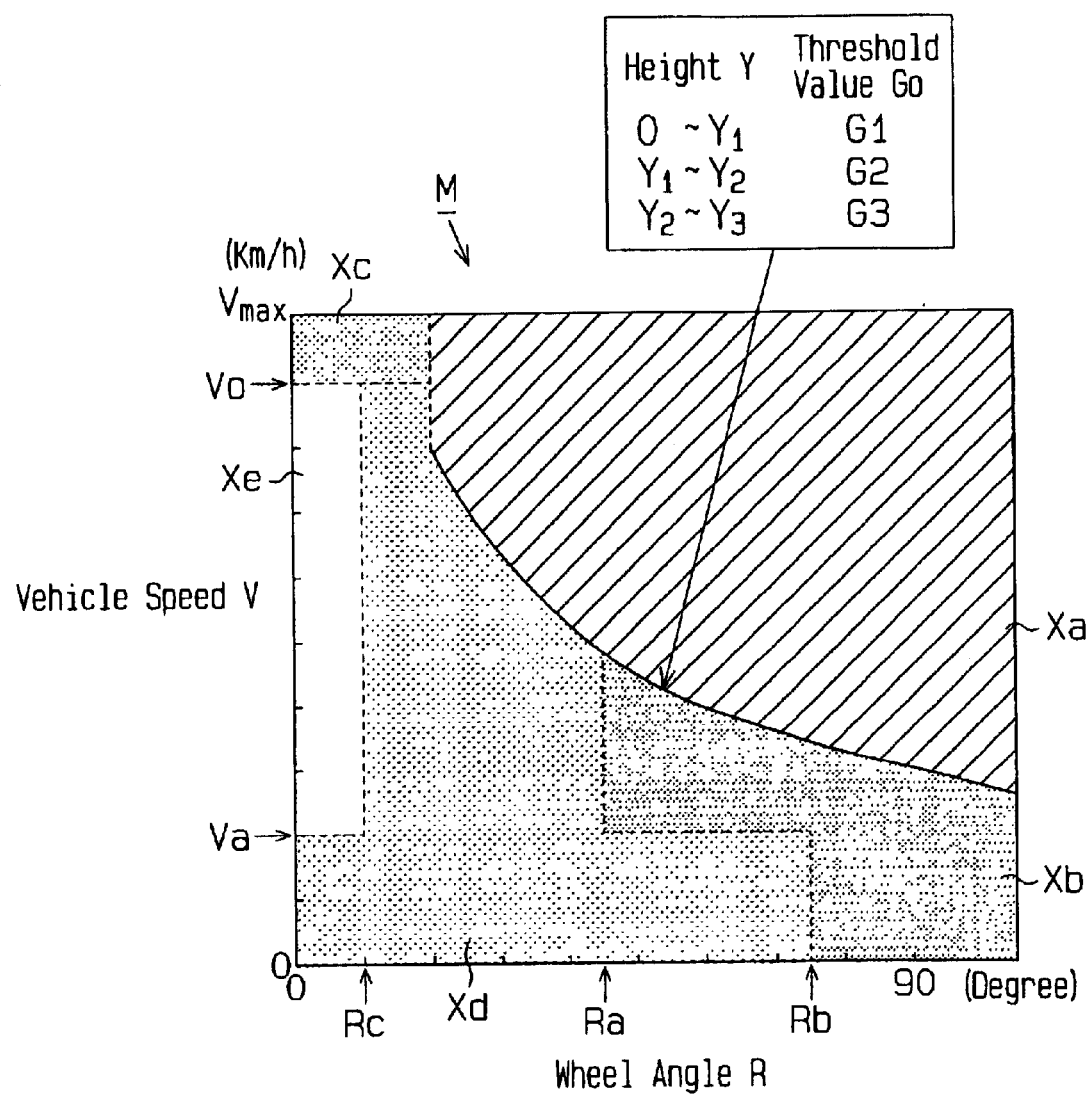
FIG. 20 is a map used at a time of inhibiting a compensation in a third embodiment.
Figure 21:
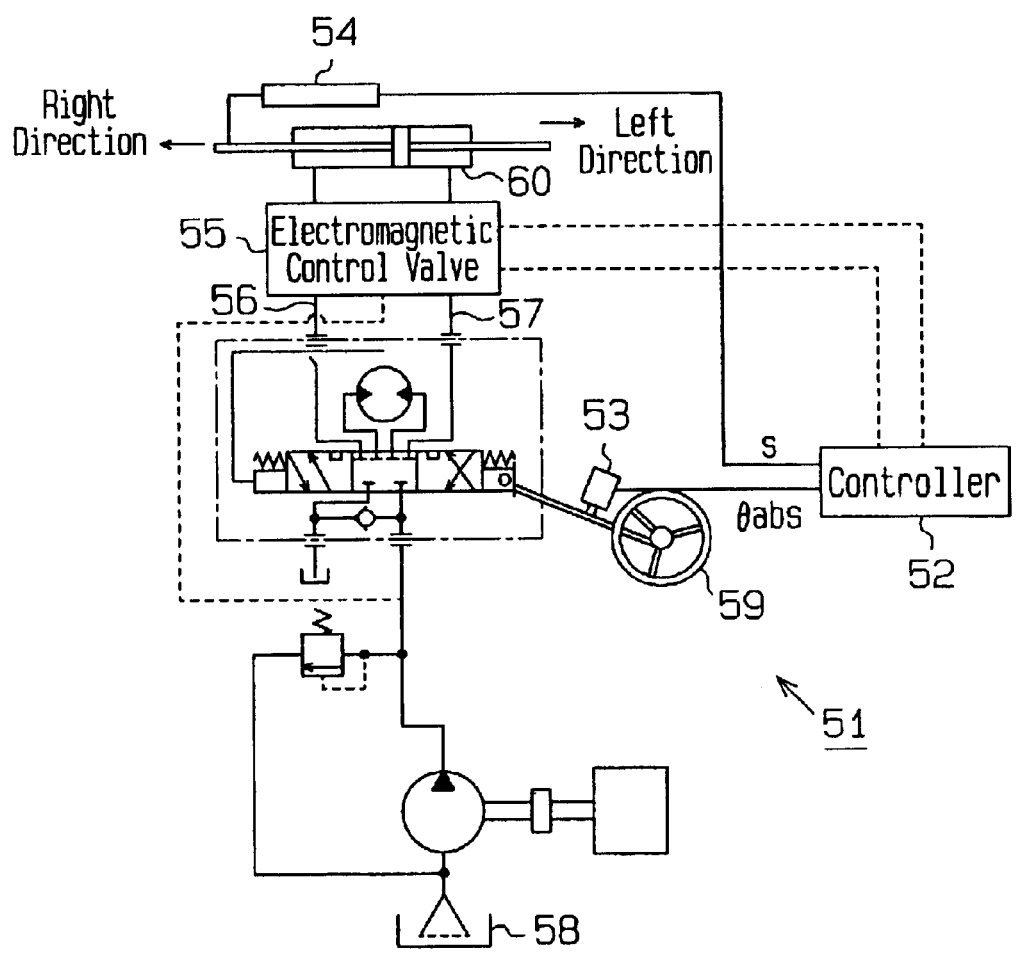
FIG. 21 is a schematic view of an outline structure of a power steering apparatus in accordance with a prior art.
Figure 22:
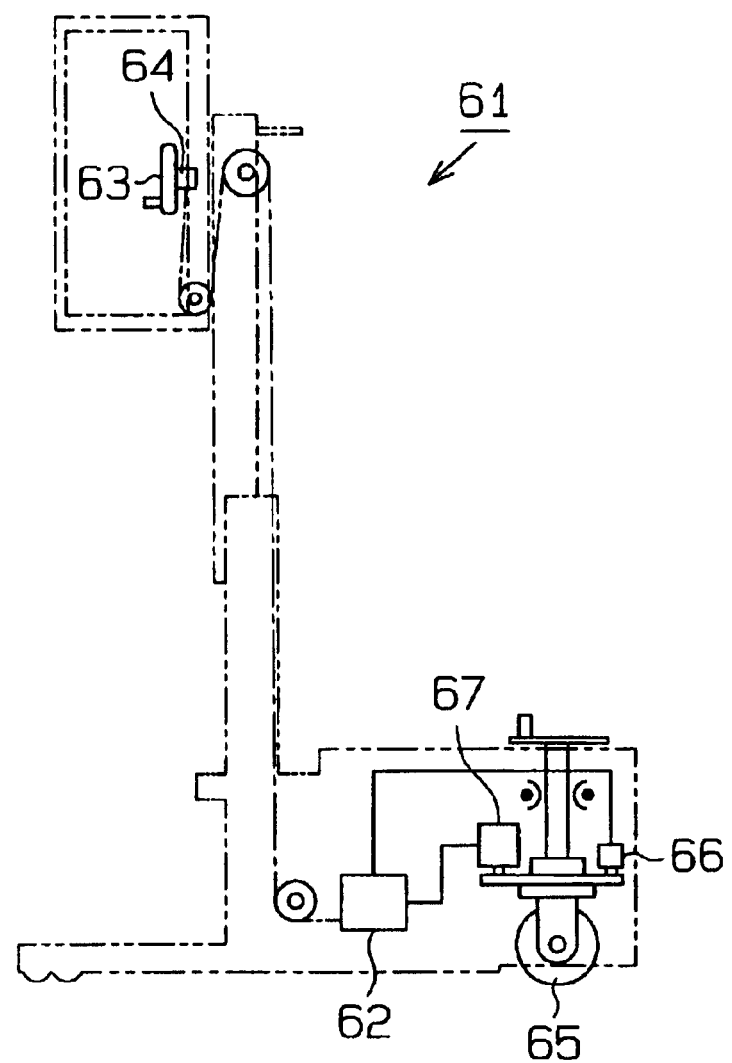
FIG. 22 is a schematic view of an outline structure of an order picking truck provided with a total electric type steering apparatus in accordance with the prior art.

In a map M shown in FIG. 20, the threshold value Go of the lateral acceleration G is set so that the value is changed in correspondence to the height Y, and is set so that the threshold value becomes G1 in the case where the height Y is between 0 and Y1, the threshold value becomes G2 in the case where the height Y is between Y1 and Y2, and the threshold value becomes G3 in the case where the height Y is between Y2 and Y3. In this case, among Y1 to Y3 and G1 to G3, there are established relations 0<Y1<Y2<Y3, and G1>G2>G3. In the case where the height Y is high, a center of gravity in the vehicle becomes high, and the balance of the vehicle body 2 is deteriorated, whereby the vehicle body 2 becomes in the unstable state, but since the threshold value Go of the lateral acceleration G is changed in correspondence to the height Y, the threshold value Go becomes a most appropriate value in correspondence to the height Y.

In particular, since the order picking type forklift 1 is structured such that the driver's stand 4 moves upward and downward along the mast 5, the driver easily feels a rolling when the driver's stand 4 exists at a high position, even when the lateral acceleration G is comparatively low. However, since the threshold value Go of the lateral acceleration G becomes smaller at a time when the height Y is high, the holding force of the steered tire wheel 16 is easily secured at that degree, and the driver is hard to feel the rolling even when the driver's stand 4 is positioned at the high place.

Accordingly, in accordance with this embodiment, it is possible to obtain the following effects.

(1) Since the height Y is detected by the height sensor 42 and the threshold value Go of the lateral acceleration G is changed in correspondence to the height Y, the threshold value Go becomes a most appropriate value in correspondence to the height Y, and it is possible to set a delicate compensation inhibiting condition. In particular, in the order picking type forklift 1, when the driver's stand 4 exists at the high position, the driver easily feels the rolling even by a comparatively small lateral acceleration G. However, since the threshold value Go of the lateral acceleration G is set to be small so as to cancel the risk, it is hard to feel the rolling even when the driver's stand 4 is positioned at the high place. Accordingly, it is possible to reduce an unnecessary steering wheel knob position compensation even when the height Y is changed, and it is possible to securely execute a necessary knob position compensation.

(2) Even when the lateral acceleration G is equal to or less than the threshold value Go, the output of the PS motor 36 is not reduced at the curve traveling time or the like since the first compensation is inhibited in the compensation inhibiting area Xb. The wheel angle of the steered tire wheel 16 is substantially equal to or more than 40° at the curve traveling time. Accordingly, the following property of the steered tire wheel 16 is secured with respect to the operation of the steering wheel 17, and it is possible to steer the steered tire wheel 16 in such a manner as to be capable of drawing the curve intended by the driver. Further, it is possible to secure the following property of the steered tire wheel 16 with respect to the steering wheel 17 in the case where the steered tire wheel 16 exists close to the end.

(3) Since the steering wheel 17 is not mechanically connected to the steered tire wheel 16 in the total electric type steering mechanism, the steering wheel 17 freely rotates even when the steered tire wheel 16 is positioned at the end, so that the actual knob position N of the steering wheel 17 is easily deviated with respect to the target knob position No. In the present embodiment, as well as that the steering wheel knob position compensation can be executed by reducing the output of the PS motor 36 for the purpose of canceling the deviation, it is possible to inhibit the knob position compensation in the case where a large external force is applied to the steered tire wheel 16 even in the case of inhibiting the compensation.

(4) Since the threshold value Go of the lateral acceleration G is set step by step every predetermined range, in correspondence to the height Y, a simple program may be employed.

In this case, the third embodiment is not limited to the structure mentioned above, but may be, for example, changed as follows.

The judgement whether or not the lateral acceleration G becomes equal to or more than the threshold value Go is not limited to the matter of being judged on the basis of the vehicle speed and the wheel angle R by using the map M. For example, the structure may be made such as to determine a reciprocal value 1/r of the turning radius on the basis of the wheel angle R, compute the lateral acceleration G in accordance with a formula $G=V^2/r$ by using the vehicle speed V and compare the value with the threshold value Go.

The lateral acceleration G is not limited to be determined in accordance with the map M in which the vehicle speed V and the wheel angle R are set as the parameter. For example, the structure may be made such that the lateral acceleration sensor is provided in the vehicle body 2, and the lateral acceleration G is computed on the basis of the detection value of the lateral acceleration sensor. Further, the structure may be made such that the map in which a yaw rate sensor and the vehicle speed are set to two parameters is prepared, and the lateral acceleration is determined on the basis of the coordinate on the map.

The setting of the threshold values G1, G2 and G3 of the acceleration G may be freely changed in correspondence to the specification. Further, the values Y1, Y2 and Y3 designating the range of the height Y may be freely changed in correspondence to the specification.

The threshold value Go of the lateral acceleration G is not limited to the value which is changed step by step every predetermined ranges, but may be set to a value which is continuously changed in correspondence to the height Y.

The structure is not limited to the structure made such that both of the first compensation and the second compensation are inhibited in the compensation inhibiting area Xa, but one of the first compensation and the second compensation may be inhibited.

The map M is not limited to be provided with all of the compensation inhibiting areas Xa, Xb, Xc and Xd. For example, the map M may be structured such that only the compensation inhibiting area Xa is set, or the compensation may be inhibited only in the area at the curve traveling time in the compensation inhibiting area Xb. Further, the compensation inhibiting area on the map M may be set by a combination of any one of the area Xa and the area at the curve traveling time, and at least one of the area Xb, the area Xc, the area Xd, the area close to the end of the steered tire wheel 16 and the steering wheel high speed steering area.

The area range of the compensation inhibiting area Xb may be changed by changing the threshold values Ra, Rb and Va in correspondence to the height Y.

The set value Sa of the steering wheel operating speed S which is used for judging whether or not the steering wheel 17 rotates at the high speed is not limited to 2.0 (rps), but may be a value that the steering wheel 17 can be assumed to be rotated at a high speed, for example, 1.8, 2.0 or the like.

The set value So of the steering wheel operating speed S which is used for judging whether or not the steering wheel 17 is slowly steered is not limited to 0.5 (rps), but may be a value that the steering wheel 17 can be assumed to be operated slowly, for example, 0.1, 0.3 or the like. Further, the judgement is not limited to be executed only in the compensation inhibiting area Xd, but may be executed in the other compensation inhibiting areas Xa, Xb and Xc.

Therefore, the present examples and embodiments are to be considered as illustrative and not restrictive and the invention is not to be limited to the details given herein, but may be modified within the scope and equivalence of the appended claims.

What is claimed is:

1. A steering apparatus of a vehicle provided with a steered tire wheel which is steered in correspondence to an operation of a steering wheel, comprising:

first detecting means for detecting an actual position indicating a present rotational position of the steering wheel;

second detecting means for detecting a wheel angle of the steered tire wheel;

electric type drive means for driving the steered tire wheel, said drive means outputting a power output for operating the steered tire wheel in correspondence to a steering wheel operation; and compensating means for executing a first compensation for compensating an actual position of said steering wheel, said compensating means controlling the power output of said drive means at a time when a deviation is detected between the actual position of said steering wheel detected by said first detecting means and a wheel angle of said steered tire wheel detected by said second detecting means, thereby reducing said deviation, wherein said compensating means executes a second compensation for reducing a difference in the power output of the drive means between before and after the deviation is cancelled, at a time when the deviation between the actual position of said steering wheel and the wheel angle of the steered tire wheel is cancelled by executing the first compensation.

2. The steering apparatus according to claim 1, wherein said second compensation changes the power output of the drive means to a power output which is smaller than the power output of the drive means before said deviation is cancelled and the power output of the drive means after the deviation is cancelled.

3. The steering apparatus according to claim 2, wherein said second compensation stops the power output of said drive means.

4. A steering apparatus of a vehicle provided with a steered tire wheel which is steered in correspondence to an operation of a steering wheel, comprising:

first detecting means for detecting an actual position indicating a present rotational position of the steering wheel;

second detecting means for detecting a wheel angle of the steered tire wheel;

electric type drive means for driving the steered tire wheel, said drive means outputting a power output for operating the steered tire wheel in correspondence to a steering wheel operation; and compensating means for executing a first compensation for compensating an actual position of said steering wheel, said compensating means controlling the power output of said drive means at a time when a deviation is detected between the actual position of said steering wheel detected by said first detecting means and a wheel angle of said steered tire wheel detected by said second detecting means, thereby reducing said deviation, wherein said steering wheel can be rotated at a plurality of turns, and said first detecting means detects the actual position of the steering wheel on the basis of a relative angle per one rotation of the steering wheel.

5. The steering apparatus according to claim 4, wherein said steering apparatus converts the wheel angle of said steered tire wheel into a relative angle of every one rotation of said steering wheel in order to compute a steering wheel target position which is necessary for canceling said deviation.

6. The steering apparatus according to claim 5, wherein said steering apparatus computes a deviation angle between the actual position of said steering wheel and the target position, and changes the power output of said drive means in correspondence to the result of computation.

7. The steering apparatus according to claim 6, wherein said compensating means executes the compensation at a time when said deviation angle is equal to or less than 180°.

8. A steering apparatus of a vehicle provided with a steered tire wheel which is steered in correspondence to an operation of a steering wheel, comprising:

first detecting means for detecting an actual position indicating a present rotational position of the steering wheel;

second detecting means for detecting a wheel angle of the steered tire wheel;

third detecting means for detecting an operating speed of said steering wheel;

compensation executing means for executing a compensation of a steering wheel position so as to cancel a deviation in a positional relation between an actual position of said steering wheel and a wheel angle of said steered tire wheel at a time of operating the steering wheel, on the basis of a detection value output from said first detecting means and said second detecting means, in the case where the deviation is generated; and compensation inhibiting means for inhibiting the compensation of the steering wheel position executed by said compensation executing means at a time when the steering wheel is operated at a high speed, in such a manner that the operating speed of said steering wheel detected by said third detecting means becomes over a first threshold value.

9. The steering apparatus according to claim 8, further comprising a vehicle speed detecting means for detecting a vehicle speed,
wherein said compensation inhibiting means inhibits the compensation of the steering wheel position executed by said compensation executing means at a time when the vehicle travels at a speed, in such a manner that the vehicle speed detected by said vehicle speed detecting means becomes over a threshold value.

10. The steering apparatus according to claim 8, wherein said compensation inhibiting means inhibits the compensation of the steering wheel position at a time when the operating speed of said steering wheel detected by said third detecting means is operated at a speed equal to or less than a second threshold value.

11. The steering apparatus according to claim 8, wherein said compensation executing means is provided with drive means for applying a power output to said steered tire wheel in such a manner that said steered tire wheel becomes a wheel angle in correspondence to the operating amount of said steering wheel, and executes the compensation of the steering wheel position by restricting the power output of said drive means, at a time when a deviation is generated in the positional relation between the actual position of said steering wheel and the wheel angle of said steered tire wheel.

12. The steering apparatus according to claim 11, wherein said drive means is electric type drive means, and said electric type drive means is electrically controlled on the basis of a detection value output from said first detecting means and said second detecting means.

13. The steering apparatus according to claim 11, wherein said compensation executing means reduces the power output of said drive means and executes a first execution for generating a racing state of said steering wheel, at a time when a deviation is generated in the positional relation between the actual position of said steering wheel and the wheel angle of said steered tire wheel.

14. The steering apparatus according to claim 11, further comprising second compensation executing means for executing a second compensation for reducing a difference in a power output of said drive means between before and after the actual position of said steering wheel coincides with the wheel angle of said steered tire wheel in the positional relation.

15. The steering apparatus according to claim 14, wherein said second compensation executing means executes the second compensation by lowering the power output of said drive means.

16. The steering apparatus according to claim 8, wherein said compensation executing means computes a target position of said steering wheel on the basis of the wheel angle of the steered tire wheel detected by said second detecting means, and executes the compensation of the steering wheel position in such a manner as to cancel the deviation between the actual position of said steering wheel and the target position.

17. The steering apparatus according to claim 8, wherein said first threshold value is set to a value within a range of between 1.5 and 2.5 rps.

18. The steering apparatus according to claim 8, wherein said vehicle is an industrial vehicle.

19. The steering apparatus according to claim 18, wherein said industrial vehicle is an order picking type forklift which is provided with a vehicle body, a mast apparatus provided in the vehicle body, and a driver's stand moving upward and downward by the mast apparatus.

20. A steering apparatus of an industrial vehicle which is provided with a steered tire wheel steered in correspondence to an operation of a steering wheel and transfers a load, comprising:
first detecting means for detecting an actual position indicating a present rotational position of a steering wheel;
second detecting means for detecting a wheel angle of the steered tire wheel;
height detecting means for detecting a vertical position of the load;
lateral acceleration detecting means for detecting a lateral acceleration of the vehicle;
compensation executing means for executing a compensation of a steering wheel position so as to cancel a deviation in a positional relation between an actual position of said steering wheel and a wheel angle of said steered tire wheel at a time of operating said steering wheel, on the basis of a detection value output from said first and second detecting means;
threshold value changing means for changing a threshold value of the lateral acceleration in correspondence to the height detected by said height detecting means; and
compensation inhibiting means for inhibiting the compensation of the steering wheel position executed by said compensation executing means at a time when the lateral acceleration detected by said lateral acceleration detecting means becomes over said threshold value.

21. The steering apparatus according to claim 20, further comprising vehicle speed detecting means for detecting a vehicle speed,
wherein said compensation inhibiting means inhibits the compensation of the steering wheel position executed by said compensation executing means at a time when the vehicle travels around a curve with a predetermined turning radius which is determined on the basis of the vehicle speed detected by said vehicle speed detecting means and the wheel angle detected by the second detecting means even when the lateral acceleration is equal to or less than the threshold value.

22. The steering apparatus according to claim 21, wherein the wheel angle of the steered tire wheel is substantially equal to or more than 40° at said curve traveling time.

23. The steering apparatus according to claim 20, wherein said compensation inhibiting means inhibits the compensation of the steering wheel position executed by said compensation executing means, on the basis of the detection value output from said second detecting means, in the case where the wheel angle of said steered tire wheel is over a preset threshold value.

24. The steering apparatus according to claim 20, further comprising vehicle speed detecting means for detecting a vehicle speed,
wherein said compensation inhibiting means inhibits the compensation of the steering wheel position executed by said compensation executing means in the case of traveling at a high speed in which the vehicle speed detected by said vehicle speed detecting means is over a predetermined threshold value.

25. The steering apparatus according to claim 20, further comprising third detecting means for detecting an operating speed of said steering wheel,
wherein said compensation inhibiting means inhibits the compensation of the steering wheel position in the case of operating at a high speed in which the steering wheel operating speed detected by said third detecting means is over a predetermined threshold value.

26. The steering apparatus according to claim 20, further comprising third detecting means for detecting an operating speed of said steering wheel,
wherein said compensation inhibiting means inhibits the compensation of the steering wheel position when the steering wheel operating speed detected by said third detecting means is under a predetermined threshold value.

27. The steering apparatus according to claim 20, wherein said compensation executing means is provided with drive means for applying a power output to said steered tire wheel in such a manner that said steered tire wheel has a wheel angle in correspondence to the operating amount of said steering wheel, and executes the compensation of the steering wheel position by restricting the power output of said drive means, at a time when a deviation is generated in the positional relation between the actual position of said steering wheel and the wheel angle of said steered tire wheel.

28. The steering apparatus according to claim 20, wherein said compensation executing means computes a target position of said steering wheel on the basis of the wheel angle of the steered tire wheel detected by said second detecting means, and executes the compensation of the steering wheel position in such a manner as to cancel the deviation between the actual position of said steering wheel and the target position.

29. The steering apparatus according to claim 28, wherein said compensation inhibiting means inhibits the compensation of the steering wheel position executed by said compensation executing means at a time when the actual position is operated in a direction of moving apart from the target position, in the case of operating said steering wheel.

30. The steering apparatus according to claim 29, wherein said compensation executing means is provided with drive means for applying a power output to said steered tire wheel in such a manner that said steered tire wheel has a wheel angle in correspondence to the operating amount of said steering wheel, wherein said compensation executing means executes a first compensation for restricting the power output of said drive means and making the actual position catch up with the target position at a time when the actual position of said steering wheel is deviated with respect to the target position, and executes a second compensation for restricting the power output of said drive means at a time when the actual position of the steering wheel coincides with the target position.

31. The steering apparatus according to claim 20, wherein said threshold value changing means changes the threshold value step by step.

32. The steering apparatus according to claim 20, wherein said industrial vehicle is an order picking type forklift which is provided with a vehicle body, a mast apparatus provided in the vehicle body, and a driver's stand moving upward and downward by the mast apparatus.

33. A steering apparatus of a vehicle which is provided with a steered tire wheel steered in correspondence to an operation of a steering wheel, comprising:
first detecting means for detecting an actual position indicating a present rotational position of a steering wheel;
second detecting means for detecting a wheel angle of the steered tire wheel;
vehicle speed detecting means for detecting a vehicle speed;
compensation executing means for executing a compensation of a steering wheel position so as to cancel a deviation in a positional relation between an actual position detected by said first detecting means and a wheel angle detected by said second detecting means at a time of operating said steering wheel, in the case where the deviation is generated; and
compensation inhibiting means for inhibiting the compensation of the steering wheel position executed by said compensation executing means at a time when the vehicle travels around a curve with a predetermined turning radius which is determined on the basis of the vehicle speed detected by said vehicle speed detecting means and the wheel angle detected by the second detecting means.

34. The steering apparatus according to claim 33, wherein said compensation inhibiting means inhibits the compensation of the steering wheel position executed by said compensation executing means, in the case where the wheel angle of said steered tire wheel detected by said second detecting means is over a predetermined threshold value.

35. The steering apparatus according to claim 33, wherein said compensation inhibiting means inhibits the compensation of the steering wheel position executed by said compensation executing means, in the case of traveling at a high speed in which the vehicle speed detected by said vehicle speed detecting means is over a predetermined threshold value.

36. A steering apparatus of an industrial vehicle which is provided with a steered tire wheel steered in correspondence to an operation of a steering wheel and transfers a load, comprising:
first detecting means for detecting an actual position indicating a present rotational position of a steering wheel;
second detecting means for detecting a wheel angle of the steered tire wheel;
vehicle speed detecting means for detecting a vehicle speed;
height detecting means for detecting a height of the load;
compensation executing means for executing a compensation of a steering wheel position at a time of operating said steering wheel so as to cancel a deviation in a positional relation between an actual position of said steering wheel and a wheel angle of said steered tire wheel, on the basis of the detection values output from said first and second detecting means; and
compensation inhibiting means for previously determining a compensation inhibiting area on the basis of the detection values output from said vehicle speed detecting means, the second detecting means and the height detecting means and inhibiting the compensation of the steering wheel position in the compensation inhibiting area.

37. The steering apparatus according to claim 36, wherein said vehicle is a forklift.

38. The steering apparatus according to claim 37, wherein said forklift is an order picking type forklift which is provided with a vehicle body, a mast apparatus provided in the vehicle body, and a driver's stand moving upward and downward by the mast apparatus.

39. A steering apparatus of a vehicle which is provided with a steered tire wheel steered in correspondence to an operation of a steering wheel, comprising:

first detecting means for detecting an operation angle of the steering wheel;

second detecting means for detecting a wheel angle of the steered tire wheel;

drive means for driving the steered tire wheel, said drive means having a predetermined link ratio set between said steering wheel and said steered tire wheel;

control means for controlling said drive means in such a manner that the wheel angle of said steered tire wheel catches up with the operation angle of the steering wheel, with reference to said link ratio and on the basis of the operation angle of the steering wheel and the wheel angle detected by said first and second detecting means;

steering wheel operation detecting means for detecting a stop of the steering wheel operation and a turning back; and stopping means for stopping the drive of said drive means, at a time when said steering wheel operation detecting means detects the stop of said steering wheel operation or the turning back.

40. The steering apparatus according to claim 39, further comprising compensating means for stopping or reducing the power output of said drive means in such a manner as to make a deviation in a positional relation detected between said operation angle and said wheel angle small.

41. The steering apparatus according to claim 40, wherein a second compensation for reducing a difference in the power output of said drive means between before and after said operation angle coincides with said wheel angle in the position relation is executed at a time of the coincidence.

42. The steering apparatus according to claim 39, wherein said control means computes the target position of said steering wheel on the basis of the wheel angle of the steered tire wheel, and executes the compensation of the steering wheel position in such a manner as to make the deviation between the actual position of said steering wheel and the target position small.

43. The steering apparatus according to claim 39, wherein said drive means is of an electric type.

44. The steering apparatus according to claim 39, wherein said vehicle is an order picking type forklift which is provided with a vehicle body, a mast apparatus provided in the vehicle body, and a driver's stand moving upward and downward by the mast apparatus.

45. A steering apparatus of a vehicle which is provided with a steered tire wheel steered in correspondence to an operation of a steering wheel, comprising:

first detecting means for detecting an operation angle of the steering wheel;

second detecting means for detecting a wheel angle of the steered tire wheel;

drive means for driving the steered tire wheel, said drive means having a predetermined link ratio set between said steering wheel and said steered tire wheel;

computing means for computing an angle difference between the operation angle of said steering wheel and the wheel angle of the steered tire wheel, with reference to said link ratio;

control means for controlling said drive means in such a manner that a drive force in correspondence to said angle difference can be obtained;

steering wheel operation detecting means for detecting a stop of the steering wheel operation and a turning back; and stopping means for stopping the drive of said drive means, at a time when said steering wheel operation detecting means detects the stop of said steering wheel operation or the turning back.

46. The steering apparatus according to claim 45, wherein said stopping means resets said angle difference determined by said computing means to 0 at a time when said steering wheel operation detecting means detects the stop of said steering wheel operation or the turning back.

47. The steering apparatus according to claim 45, wherein said computing means is provided with storing means for storing at least one detection value of the operation angle of the steering wheel and the wheel angle of the steered tire wheel.

48. The steering apparatus according to claim 45, wherein said first detecting means is provided with a sensor which outputs a corresponding number of pulses to a deviation amount of the operation angle of the steering wheel, and a counter which counts the pulses output from the pulse type sensor.

49. The steering apparatus according to claim 45, wherein said second detecting means includes a potentiometer which outputs a detection signal in correspondence to the wheel angle of the steered tire wheel.

* * * * *

UNITED STATES PATENT AND TRADEMARK OFFICE
CERTIFICATE OF CORRECTION

PATENT NO. : 6,807,471 B2
DATED : October 19, 2004
INVENTOR(S) : Hiroyuki Fujimori It is certified that error appears in the above-identified patent and that said Letters Patent is hereby corrected as shown below:

Title page,
Item [56], References Cited, please add
-- U.S. PATENT DOCUMENTS

| | | | |
|---|---|---|---|
| 6,176,341 | 1/2001 | Ansari | 180/402 |
| 6,612,395 | 9/2003 | Moser et al. | 180/446 |
| 6,594,568 | 7/2003 | Matsuoka | 701/41 |
| 6,561,308 | 5/2003 | Carroll et al. | 180/446 |
| 2002/0157894 | 10/2002 | Hjelsand et al. | 180/446 |
| 2003/0141835 | 7/2003 | Zheng et al. | 318/434 |

FOREIGN PATENT DOCUMENTS

JP  2001-1932  1/2001
JP  11-115778  4/1999 --

Signed and Sealed this

Twenty-sixth Day of April, 2005

JON W. DUDAS
*Director of the United States Patent and Trademark Office*